(12) United States Patent
Onufryk et al.

(10) Patent No.: US 8,429,325 B1
(45) Date of Patent: Apr. 23, 2013

(54) PCI EXPRESS SWITCH AND METHOD FOR MULTI-PORT NON-TRANSPARENT SWITCHING

(75) Inventors: Peter Z. Onufryk, Flanders, NJ (US); Cesar A. Talledo, San Jose, CA (US)

(73) Assignee: Integrated Device Technology Inc., San Jose, CA (US)

( * ) Notice: Subject to any disclaimer, the term of this patent is extended or adjusted under 35 U.S.C. 154(b) by 243 days.

(21) Appl. No.: 12/852,399

(22) Filed: Aug. 6, 2010

(51) Int. Cl.
*G06F 13/36* (2006.01)

(52) U.S. Cl.
USPC ............................ 710/316; 710/312; 710/314

(58) Field of Classification Search .......... 710/104–119, 710/306–317; 709/231–234
See application file for complete search history.

(56) References Cited

U.S. PATENT DOCUMENTS

| | | | | |
|---|---|---|---|---|
| 6,956,579 B1* | 10/2005 | Diard et al. | ............. | 345/537 |
| 6,985,152 B2* | 1/2006 | Rubinstein et al. | ........... | 345/520 |
| 7,099,969 B2* | 8/2006 | McAfee et al. | ............... | 710/107 |
| 7,478,187 B2* | 1/2009 | Knepper et al. | .............. | 710/300 |
| 7,600,112 B2* | 10/2009 | Khatri et al. | .................. | 713/100 |
| 7,617,348 B2* | 11/2009 | Danilak | ........................ | 710/305 |
| 7,743,197 B2* | 6/2010 | Chavan et al. | ................. | 710/314 |
| 2006/0098020 A1* | 5/2006 | Shen et al. | ..................... | 345/520 |
| 2007/0139423 A1* | 6/2007 | Kong et al. | .................... | 345/502 |
| 2007/0162632 A1* | 7/2007 | Ng et al. | .......................... | 710/15 |
| 2009/0167771 A1* | 7/2009 | Franko et al. | ................. | 345/502 |
| 2010/0257301 A1* | 10/2010 | Kloeppner et al. | ........... | 710/313 |
| 2011/0246686 A1* | 10/2011 | Cavanagh et al. | .............. | 710/22 |

\* cited by examiner

*Primary Examiner* — Raymond Phan
(74) *Attorney, Agent, or Firm* — Kenneth Glass; Stanley J. Pawlik; Glass & Associates

(57) ABSTRACT

A peripheral component interconnect express (PCIe) switch includes non-transparent endpoints, each of which is associated with a bus hierarchy domain. A source non-transparent endpoint in a source bus hierarchy domain receives a packet including a destination address and identifies a destination bus hierarchy domain including a destination non-transparent endpoint based on the destination address. Further, the source non-transparent endpoint translates a requester identifier in the packet to a translated requester identifier and generates a translated request packet including the translated requester identifier. The PCIe switch routes the translated request packet to the destination non-transparent endpoint through a non-transparent interconnect in the PCIe switch. In this way, the PCIe switch interconnects multiple bus hierarchy domains and is non-transparent in the multiple bus hierarchy domains. In further embodiments, the PCIe switch routes multicast packets to multiple destination non-transparent endpoints in multiple destination bus hierarchy domains.

30 Claims, 17 Drawing Sheets

| 600 Address Translation Table ||||
|---|---|---|---|
| 305 Index | 615 Valid Bit | 620 Destination Domain Identifier | 625 Translated Base Address |
| 305 Index | 615 Valid Bit | 620 Destination Domain Identifier | 625 Translated Base Address |
| . . . | | | |
| 305 Index | 615 Valid Bit | 620 Destination Domain Identifier | 625 Translated Base Address |

605 points to each row.

| 625 Translated Base Address | 310 Offset |
|---|---|

FIG. 7

800
Requester Identifier Translation Table

| 810 Index | 815 Valid Bit | 820 Source Domain Identifier | 400 Bus Value | 405 Device Value | 410 Function Value |
|---|---|---|---|---|---|
| 810 Index | 815 Valid Bit | 820 Source Domain Identifier | 400 Bus Value | 405 Device Value | 410 Function Value |
| ... | ... | ... | ... | ... | ... |
| 810 Index | 815 Valid Bit | 820 Source Domain Identifier | 400 Bus Value | 405 Device Value | 410 Function Value |
| 810 Index | 815 Valid Bit | 820 Source Domain Identifier | 400 Bus Value | 405 Device Value | 410 Function Value |

805 points to rows.

| 900 Destination NT Endpoint Identifier | 810 Index |
|---|---|

| 1000 Destination NT Endpoint Bus Value | 1005 Destination NT Endpoint Device Value | 1010 Destination NT Endpoint Function Value |
|---|---|---|

FIG. 10

| 305 Index | 615 Valid Bit | 620 Destination Domain Identifier | 625 Translated Base Address | 615 Valid Bit | 620 Destination Domain Identifier | 625 Translated Base Address | . . . | 615 Valid Bit | 620 Destination Domain Identifier | 625 Translated Base Address |
|---|---|---|---|---|---|---|---|---|---|---|
| 305 Index | 615 Valid Bit | 620 Destination Domain Identifier | 625 Translated Base Address | 615 Valid Bit | 620 Destination Domain Identifier | 625 Translated Base Address | . . . | | | |
| . . . | | | | | | | | | | |
| 305 Index | 615 Valid Bit | 620 Destination Domain Identifier | 625 Translated Base Address | 615 Valid Bit | 620 Destination Domain Identifier | 625 Translated Base Address | . . . | 615 Valid Bit | 620 Destination Domain Identifier | 625 Translated Base Address |

600 Address Translation Table

PCI EXPRESS SWITCH AND METHOD FOR MULTI-PORT NON-TRANSPARENT SWITCHING

BACKGROUND

Peripheral component interconnect express (PCIe) is a connection system for connecting a host processor to PCIe devices in a PCIe system. In contrast to a peripheral component interconnect (PCI) system which uses a shared parallel bus for communication between PCI devices, a PCIe system uses point-to-point serial links for communication between PCIe devices. The PCIe links are organized in a tree structure topology that originates at a port of a root complex in the PCIe system and ends at PCIe endpoint devices (e.g., peripheral devices) in the PCIe system. To preserve compatibility with existing PCI standards, PCIe standards model physical point-to-point serial links as logical PCI busses. Thus in a typical PCIe system, PCIe devices are interconnected to each other through one or more logical PCI busses. In a PCIe system, the root complex, the PCIe devices, and the logical PCI busses are collectively referred to as a PCIe hierarchy. The portion of the PCIe hierarchy originating at the root complex port, which includes PCIe devices and logical PCI busses, is referred to as a bus hierarchy domain. Moreover, all PCIe devices in the bus hierarchy domain share a same address space of the bus hierarchy domain.

In some PCIe systems, multiple serial links are connected to each other through a PCIe switch. In these PCIe systems, the PCIe switch appears logically as a collection of PCI-to-PCI bridges interconnected by a virtual PCI bus. Moreover, each of the PCI-to-PCI bridges serves to logically connect two logical PCI busses. Because PCIe devices on both sides of a PCI-to-PCI bridge share the same address space of a bus hierarchy domain, such a PCI-to-PCI bridge is often referred to as a transparent PCI-to-PCI bridge. As a result, PCIe devices or address ranges on one side of the transparent PCI-to-PCI bridge cannot be isolated from access by PCIe devices on the opposite side of the transparent PCI-to-PCI bridge.

In a typical PCIe switch, a virtual PCI bus routes a packet between ports of the PCIe switch by broadcasting a packet received at a source connected to the virtual PCI bus to destinations connected to the virtual PCI bus. Each of the destinations connected to the virtual PCI bus has an address range in a bus hierarchy domain and monitors the virtual PCI bus for packets having destination addresses in that address range. If a destination address in a packet that is broadcast on the virtual PCI bus is in the address range of a destination connected to the virtual PCI bus, the destination accepts the packet. Otherwise, the destination ignores the packet. Although virtual PCI busses have been successfully employed for routing packets in PCIe switches, error recovery in a virtual PCI bus may be complex. For example, the virtual PCI bus must perform error recovery operations if none of the destinations connected to the virtual PCI bus accepts a packet broadcast on the virtual PCI bus.

Some types of PCIe systems include more than one bus hierarchy domain, each of which originates at a different root complex. Because the bus hierarchy domains are independent of each other, a PCIe device in one of the bus hierarchy domains is not visible to a PCIe device in another bus hierarchy domain. In these types of PCIe systems, a non-transparent PCI-to-PCI bridge is sometimes used to connect two logical PCI busses in the different bus hierarchy domains. Because each bus hierarchy domain has an independent address space and an independent device identifier space, the non-transparent PCI-to-PCI bridge performs address translation and device identifier translation between the two bus hierarchy domains connected to the non-transparent PCI-to-PCI bridge. Because the bus hierarchy domains separated by the non-transparent PCI-to-PCI bridge have independent address spaces, the PCIe system does not require a flat addressing model across the non-transparent PCI-to-PCI bridge.

Generally, a PCIe system routes a packet based on a destination address in the packet or a device identifier in the packet. In PCIe systems including a PCIe switch, the PCIe switch in the PCIe system routes a packet received from a source PCIe device in a bus hierarchy domain to a destination logical PCI bus in the same bus hierarchy domain based on a destination address or a device identifier in the packet. In PCIe systems including a non-transparent PCI-to-PCI bridge, the non-transparent PCI-to-PCI bridge forwards packets between a source bus hierarchy domain and a destination bus hierarchy domain. In this process, the PCI-to-PCI bridge receives a packet from a logical PCI bus in the source bus hierarchy domain, translates a destination address of the packet to a translated address in the destination bus hierarchy domain, generates a translated packet including the translated address, and forwards the translated packet to a logical PCI bus in the destination bus hierarchy domain. Although a non-transparent PCI-to-PCI bridge has been successfully employed in PCIe systems, such a non-transparent PCI-to-PCI bridge facilitates communication of packets between only two bus hierarchy domains.

SUMMARY

In various embodiments, a peripheral component interconnect express (PCIe) switch includes three or more ports coupled to a non-transparent interconnect. Each of the ports is associated with a unique bus hierarchy domain and includes a non-transparent endpoint. A source non-transparent endpoint of a source port in a source bus hierarchy domain receives a packet having a destination address and a requester identifier, identifies a destination bus hierarchy domain including a destination port based on the destination address, and generates a translated requester identifier based on the requester identifier. Additionally, the source non-transparent endpoint generates a translated request packet including the translated requester identifier and provides the translated request packet to the non-transparent interconnect along with a destination domain identifier of the destination bus hierarchy domain. In turn, the non-transparent interconnect routes the translated request packet to a destination non-transparent endpoint of the destination port in the destination bus hierarchy domain based on the destination domain identifier. In this way, the PCIe switch interconnects at least three bus hierarchy domains and selectively routes packets among the bus hierarchy domains but is non-transparent in each of those bus hierarchy domains. In further embodiments, the source non-transparent endpoint generates a translated address in the destination bus hierarchy domain based on the destination address and generates the translated request packet including both the translated requester identifier and the translated address.

Because the PCIe switch non-transparently interconnects at least three bus hierarchy domains, non-transparent interconnectivity between the bus hierarchy domains is improved in comparison to other PCIe switches that non-transparently interconnect only two bus hierarchy domains. Because the PCIe switch only needs a single non-transparent endpoint to provide non-transparent connectivity to a bus hierarchy domain, the PCIe switch requires less logic circuitry in comparison to other PCIe switches that require two non-transparent endpoints and a PCI-to-PCI bridge connected between the two non-transparent endpoints to provide non-transparent connectivity to a bus hierarchy domain. As a result, the PCIe switch requires less logic circuitry than these other PCIe switches. Moreover, an integrated circuit implementation of the PCIe switch consumes less die area and power than integrated circuit device implementations of these other PCIe switches, which makes the PCIe switch more scalable in comparison to these other PCIe switches. Because the PCIe switch only needs a single non-transparent endpoint to provide non-transparent connectivity to a bus hierarchy domain, the PCIe switch has a symmetry with respect to the non-transparent endpoints that is not present in these other PCIe switches. Consequently, software management of the PCIe switch is less complicated in comparison to these other PCIe switches.

Furthermore, one of the non-transparent endpoints connected to a PCI-to-PCI bridge in each of these other PCIe switches is also connected directly to a virtual PCI bus of the PCIe switch. Because the virtual PCI bus has a limited address space, the number of non-transparent bus hierarchy domains that can be interconnected through the virtual PCI bus is limited in these other PCIe switches. As a result, these other PCIe switches are not scalable in terms of the number of bus hierarchy domains that may be non-transparently interconnected through the virtual PCI bus. Also, because the non-transparent interconnect is not in any of the bus domain hierarchies including the ports of the PCIe switch, the non-transparent interconnect need not perform error recovery operations required by each of these other PCIe switches in which a packet is transmitted through a virtual PCI bus of the PCIe switch by broadcasting the packet on the virtual PCI bus.

Also in each of these other PCIe switches, the virtual PCI bus of the PCIe switch is in a bus hierarchy domain of the PCIe switch. As a result, a PCI-to-PCI bridge connected between two non-transparent ports in the PCIe switch translates a destination address of a packet in a source bus hierarchy domain to the bus hierarchy domain associated with the virtual PCI bus when forwarding the packet to the virtual PCI bus. Another PCI-to-PCI bridge connected between two non-transparent ports in the PCIe switch then translates the address in the bus hierarchy of the virtual PCI bus to a destination address in a destination bus hierarchy domain when receiving the packet from the virtual PCI bus. As a result, each of these other packets switches performs two address translations when transmitting a packet from a non-transparent endpoint in a source bus hierarchy domain to a non-transparent endpoint in a destination bus hierarchy domain.

In further embodiments, the source non-transparent endpoint of the PCIe switch identifies the received packet as a multicast packet and identifies multiple destination bus hierarchy domains based on the destination address. Additionally, the source non-transparent endpoint generates translated addresses corresponding to the destination bus hierarchy domains and generates translated request packets based on the multicast packet, each of which includes one of the translated addresses. The source non-transparent endpoint provides the translated request packets to the non-transparent interconnect along with destination domain identifiers of the destination bus hierarchy domains. In turn, the non-transparent interconnect routes the translated request packets to destination non-transparent endpoints of corresponding destination ports in the destination bus hierarchy domains based on the destination domain identifiers. In this way, the PCIe switch multicasts the multicast packet from the source port in the source bus hierarchy domain to the destination ports in the destination bus hierarchy domains. For example, the non-transparent interconnect may sequentially route the translated request packets to the destination non-transparent endpoints of the corresponding destination ports in the destination bus hierarchy domains based on the destination domain identifiers.

Because the PCIe switch routes a multicast packet from a source non-transparent endpoint of a port associated with a source bus hierarchy domain to multiple destination non-transparent endpoints of ports associated with destination bus hierarchy domains, the PCIe switch provides functionality not found in other PCIe switches. Moreover, because the non-transparent interconnect transmits packets to multiple non-transparent endpoints, the multicast routing functionality increases packet throughput of the PCIe switch in comparison to these other PCIe switches and provides multicast routing flexibility not found in these other PCIe switches. In this way, the PCIe switch is improved over these other PCIe switches.

Because the method does not require routing a packet through a virtual PCI bus connected between two non-transparent endpoints as is required in other methods, packet latency is lower in the method in comparison to these other methods. Moreover, because the method determines a destination domain identifier of a destination bus hierarchy domain based on a packet and routes the packet based on the destination identifier, the method provides greater flexibility in non-transparent routing of packets between bus hierarchy domains than these other methods.

A PCIe switch for routing peripheral component interconnect express packets, in accordance with one embodiment, includes ports and a non-transparent interconnect coupled to the ports. The ports include a source port and destination ports. The source port includes a source non-transparent endpoint associated with a source bus hierarchy domain. The source non-transparent endpoint is configured to receive a request packet including a destination address and a requester identifier. Additionally, the source non-transparent endpoint is configured to determine a destination domain identifier identifying a destination bus hierarchy domain from among destination bus hierarchy domains based on the destination address. The source non-transparent endpoint is further configured to generate a translated requester identifier for identifying the requester identifier and the source bus hierarchy domain, and generate a translated request packet based on the request packet and including the translated requester identifier. The non-transparent interconnect is configured to route the translated request packet to a destination non-transparent endpoint associated with the destination bus hierarchy domain in a destination port of the ports based on the destination domain identifier.

A PCIe switch for routing peripheral component interconnect express packets, in accordance with one embodiment, includes ports and a non-transparent interconnect coupled to the ports. The ports include a source port and destination ports. The source port includes a source non-transparent endpoint associated with a source bus hierarchy domain. The source non-transparent endpoint is configured to receive a multicast packet including a destination address and a requester identifier. Additionally, the source non-transparent endpoint is configured to determine destination domain identifiers identifying corresponding destination bus hierarchy domains based on the destination address. The source non-transparent endpoint is further configured to generate a translated requester identifier for identifying the requester identifier and the source bus hierarchy domain, and generate translated request packets based on the multicast packet and each including the translated requester identifier. The non-transparent interconnect is configured route the translated request packets to corresponding destination non-transparent endpoints associated with the destination bus hierarchy domains in destination ports of the ports based on the destination domain identifiers.

A method, in accordance with one embodiment, routes peripheral component interconnect packets through a PCIe switch. The PCIe switch includes ports and a non-transparent interconnect coupled to the ports. The method includes receiving a request packet including a destination address and a requester identifier at a source port of the plurality of ports. The source port includes a source non-transparent endpoint associated with a source bus hierarchy domain. The method further includes identifying a destination bus hierarchy domain from among destination bus hierarchy domains based on the destination address. Additionally, the method includes generating a translated requester identifier for identifying the requester identifier and the source port, and generating a translated request packet based on request packet and including the translated requester identifier. The method also includes routing the translated request packet through the non-transparent interconnect of the PCIe switch to a destination non-transparent endpoint associated with the destination bus hierarchy domain.

In various embodiments, the method identifies a destination bus hierarchy domain from among destination bus hierarchy domains as a destination of a request packet in contrast to other methods that do not produce such functionality. As a result, the method improves non-transparent interconnectivity between the bus hierarchy domains in comparison to other PCIe switches that non-transparently interconnect only two bus hierarchy domains.

A PCIe switch for routing peripheral component interconnect express packets, in accordance with one embodiment, includes ports and a non-transparent interconnect coupled to the ports. The ports include a source port and destination ports. The source port includes a source non-transparent endpoint associated with a source bus hierarchy domain. The source non-transparent endpoint is configured to receive a request packet including a destination address and a requester identifier. The source non-transparent endpoint is further configured to determine a destination domain identifier identifying a destination bus hierarchy domain from among destination bus hierarchy domains based on the destination address. The non-transparent interconnect is configured to route the request packet to a destination non-transparent endpoint associated with the destination bus hierarchy domain in a destination port of the ports based on the destination domain identifier. The non-transparent interconnect is further configured to provide a source domain identifier identifying the source bus hierarchy domain to the destination non-transparent endpoint. The destination non-transparent endpoint is configured to generate a translated requester identifier for identifying the requester identifier and the source bus hierarchy domain. The destination non-transparent endpoint is further configured to generate a translated request packet based on the request packet and including the translated requester identifier.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 6 is a block diagram of an address translation table, in accordance with an embodiment of the present invention.

FIG. 7 is a block diagram of a translated address, in accordance with an embodiment of the present invention.

FIG. 8 is a block diagram of a requester identifier translation table, in accordance with an embodiment of the present invention.

FIG. 9 is a block diagram of a translated requester identifier, in accordance with an embodiment of the present invention.

FIG. 10 is a block diagram of a translated requester identifier, in accordance with an embodiment of the present invention.

FIG. 11 is a block diagram of an address translation table, in accordance with an embodiment of the present invention.

DETAILED DESCRIPTION

In various embodiments, a source non-transparent endpoint of a peripheral component express (PCIe) switch in a source bus hierarchy domain receives a packet including a destination address and a requester identifier, identifies a destination bus hierarchy domain from among multiple bus hierarchy domains based on the destination address, and generates a translated requester identifier based on the requester identifier. Additionally, the source non-transparent endpoint generates a translated request packet including the translated requester identifier. A non-transparent interconnect in the PCIe switch routes the translated request packet to a destination non-transparent endpoint in the destination bus hierarchy domain. In some embodiments, the source non-transparent endpoint generates a translated address in the destination bus hierarchy domain based on the destination address and generates the translated request packet including both the translated requester identifier and the translated address. In further embodiments, the PCIe switch routes multicast packets from the source non-transparent endpoint to multiple destination non-transparent endpoints of the PCIe switch in multiple destination bus hierarchy domains.

Because the PCIe switch non-transparently interconnects three or more bus hierarchy domains, non-transparent interconnectivity between bus hierarchy domains is improved in the PCIe switch over other PCIe switches. In embodiments in which the PCIe switch routes multicast packets, the PCIe switch provides functionality not found in other PCIe switches. Moreover, the multicast routing functionality increases packet throughput of the PCIe switch in comparison to these other PCIe switches and provides multicast routing flexibility not found in these other packets switches. In this way, the PCIe switch is improved over these other PCIe switches.

Because a single non-transparent endpoint in the PCIe switch provides non-transparent interconnectivity to a bus hierarchy domain, the PCIe switch requires less logic circuitry than other PCIe switches. As a result, an integrated circuit implementation of the PCIe switch consumes less die area and power than integrated circuit implementations of these other packets switches. Furthermore, the number of non-transparent bus hierarchy domains that can be interconnected through the PCIe switch is scalable in comparison to other PCIe switches. Because the non-transparent interconnect routes packets to destination non-transparent endpoints based on destination identifiers of the destination bus hierarchy domains, the non-transparent interconnect need not perform error recovery operations required by other PCIe switches. Moreover, the PCIe switch need not perform more than one address translation when transmitting a packet between bus hierarchy domains.

Figure 1:
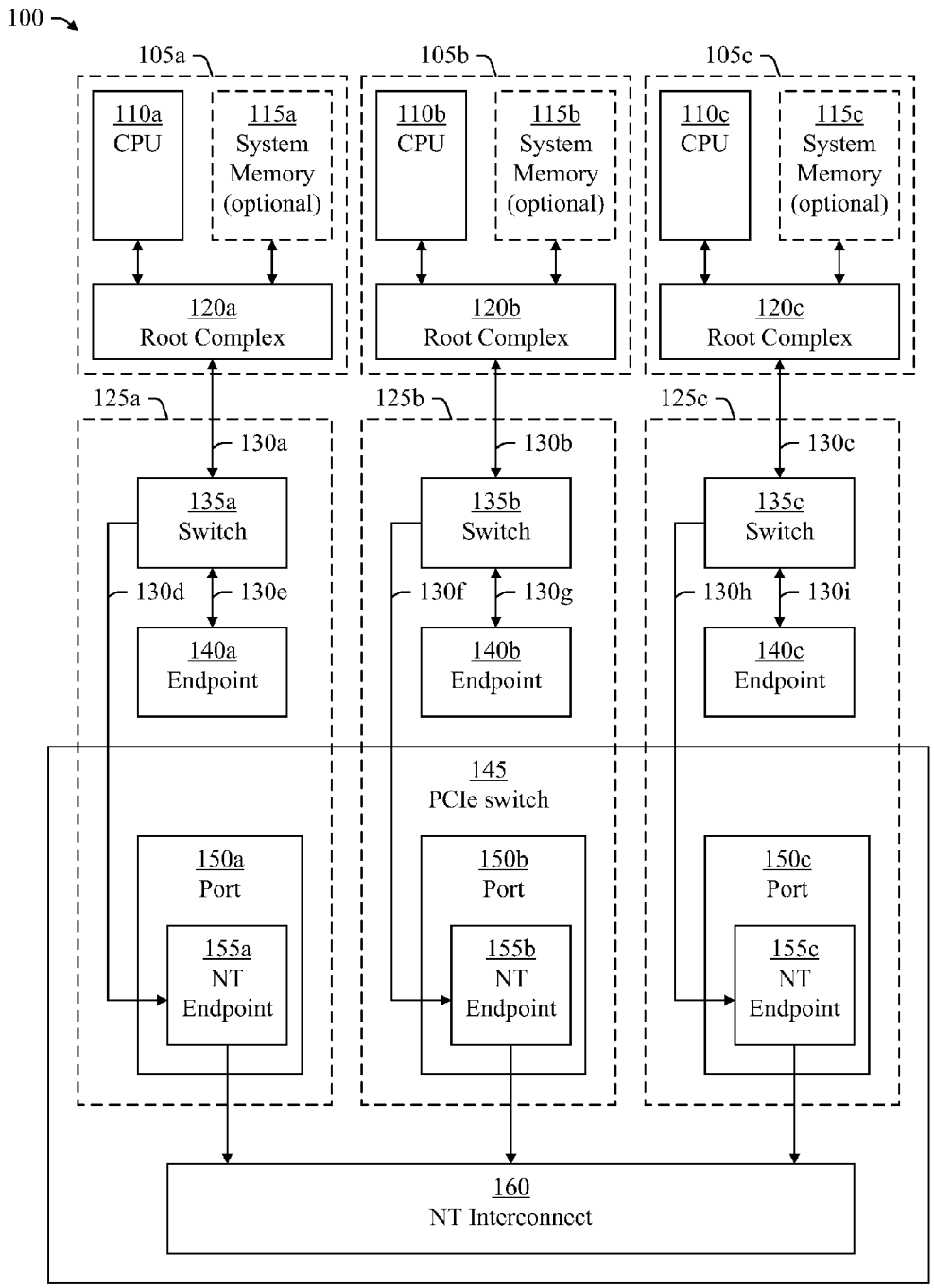
FIG. 1 is a block diagram of a computing system, in accordance with an embodiment of the present invention.

FIG. 1 illustrates a computing system 100, in accordance with an embodiment of the present invention. The computing system 100 includes root modules 105 (e.g., root modules 105a-c) and bus hierarchy domains 125 (e.g., bus hierarchy domains 125a-c) corresponding to the root modules 105. Moreover, each of the root modules 105 is coupled (e.g., connected) to a corresponding bus hierarchy domain 125. As illustrated in FIG. 1, the root module 105a is coupled to the bus hierarchy domain 125a, the root module 105b is coupled to the bus hierarchy domain 125b, and the root module 105c is coupled to the bus hierarchy domain 125c. In various embodiments, the bus hierarchy domains 125 are peripheral component interconnect (PCI) bus hierarchy domains.

Each of the root modules 105 includes a processor 110 (e.g., processor 110a-c), an optional system memory 115 (e.g., system memory 115a-c), and a root complex 120 (e.g., root complex 120a-c). As illustrated in FIG. 1, the root module 105a includes the processor 110a, the system memory 115a, and the root complex 120a. The root module 105b includes the processor 110b, the system memory 115b, and the root complex 120b. The root module 105c includes the processor 110c, the system memory 115c, and the root complex 120c.

In each of the root modules 105, the root complex 120 is coupled (e.g., connected) to both the processor 110 and the system memory 115 of the root module 105, as well as the bus hierarchy domain 125 corresponding to the root module 105. Moreover, the processor 110 communicates with the system memory 115 and the bus hierarchy domain 125 through the root complex 120. For example, the processor 110 may access data in the system memory 115 through the root complex 120 or generate packets (e.g., data packets) and send the packets through the root complex 120 to the bus hierarchy domain 125 for processing. As another example, the processor 110 may receive a packet from a bus hierarchy domain 125 through the root complex 120 and process the packet.

The computing system 100 also includes a peripheral component interconnect express (PCIe) switch 145 including ports 150 (e.g., ports 150a-c) and a non-transparent interconnect (NT Interconnect) 160 coupled (e.g., connected) to each of the ports 150. Each of the ports 150 is in a corresponding bus hierarchy domain 125. As illustrated in FIG. 1, the port 150a is in the bus hierarchy domain 125a, the port 150b is in the bus hierarchy domain 125b, and the port 150c is in the bus hierarchy domain 125c. The PCIe switch 145 facilitates communication among the bus hierarchy domains 125 by translating a packet received at a source port 150 in a bus hierarchy domain 125 and routing the packet through the non-transparent interconnect 160 to a destination port 150 in another bus hierarchy domain 125, as is described more fully herein. In various embodiments, the root modules 105 and the bus hierarchy domains 125 are components of a peripheral component interconnect express (PCIe) system conforming to a PCIe specification. For example, the PCIe specification may be the PCIe Base Specification 1.0a or the PCIe Base Specification Revision 2.1, each of which is maintained by the Peripheral Component Interconnect Special Interest Group (PCI-SIG) and is incorporated herein by reference in its entirety.

Each of the bus hierarchy domains 125 includes one or more devices interconnected through busses 130 (e.g., busses 130 a-i) in a tree structure topology originating at the root complex 120 in the bus hierarchy domain 125. For example, each of the busses 130 may be a point-to-point serial link modeled as a logical PCI bus. In the embodiment of FIG. 1, the devices in each of the bus hierarchy domains 125 include a switch 135 (e.g., a logical PCI switch) and an endpoint 140 (e.g., a PCI endpoint device).

As illustrated in FIG. 1, the bus hierarchy domain 125a includes the switch 135a and the endpoint 140a, the bus hierarchy domain 125b includes the switch 135b and the endpoint 140b, and the bus hierarchy domain 125c includes the switch 135c and the endpoint 140c. The switch 135 in a bus hierarchy domain 125 is coupled (e.g., connected) to the root complex 120 in the bus hierarchy domain 125 through a bus 130. Additionally, the switch 135 in a bus hierarchy domain 125 is connected to the endpoint 140 in the bus hierarchy domain 125 through a bus 130 and to the port 150 in the bus hierarchy domain 125 through a bus 130. In various embodiments, the busses 130 are logical PCI busses.

Each of the devices in a bus hierarchy domain 125 (e.g., switch 135, endpoint 140, and port 150) is a node in tree structure topology of the bus hierarchy domain 125. Additionally, each of the devices in the bus hierarchy domain 125 has a hierarchical level in the tree structure topology of the bus hierarchy domain 125. As may be envisioned from FIG. 1, the tree structure topology of a bus hierarchy domain 125 may have more than one node at a given hierarchical level of the tree structure topology. In the embodiment of FIG. 1, the endpoint 140 of a bus hierarchy domain 125 and the port 150 of the bus hierarchy domain 125 are nodes of the bus hierarchy domain 125 in a same hierarchical level of the tree structure topology of the bus hierarchy domain 125.

Each of the bus hierarchy domains 125 in the computing system 100 includes an address space shared among components (e.g., endpoints 140 and ports 150) in the tree structure topology of the bus hierarchy domain 125. In this way, the bus hierarchy domain 125 has a flat global address space not dependent upon the hierarchical level of a component in the tree structure topology of the bus hierarchy domain 125. Moreover, the address spaces of the bus hierarchy domains 125 are independent of each other. In various embodiments, the address space of a bus hierarchy domain 125 includes a memory space, an I/O space, a configuration space, or some combination thereof.

In various embodiments, the processor 110 in a root module 105 associated with a bus hierarchy domain 125 generates a packet and transmits the packet to the root complex 120 in the root module 105. In turn, the bus hierarchy domain 125 routes the packet to an endpoint 140 in the bus hierarchy domain 125 based on the packet. Additionally, the endpoint 140 generates a packet and the bus hierarchy domain 125 transmits the packet from the endpoint 140 to the root complex 120 based on the packet. In turn, the root complex 120 transmits the packet received from the endpoint 140 to the processor 110 of the root module 105 in the bus hierarchy domain 125. For example, the processor 110 may generate a request packet for routing to the endpoint 140, and the endpoint 140 may generate a completion packet for routing to the processor 110 in response to receiving the request packet generated by the processor 110. As another example, the endpoint 140 may generate a request packet for routing to the processor 110, and the processor 110 may generate a completion packet for routing to the endpoint 140 in response to receiving the request packet generated by the endpoint 140.

In various embodiments, each of the ports 150 of the PCIe switch 145 includes a non-transparent endpoint 155, which is in the same bus hierarchy domain 125 including the port 150. Moreover, each endpoint 140 and each non-transparent endpoint 155 in a bus hierarchy domain 125 is an endpoint device in that bus hierarchy domain 125. In operation, the root complex 120 of a bus hierarchy domain 125 assigns unique addresses in the address space of the bus hierarchy domain 125 to the endpoint devices in the bus hierarchy domain 125. For example, the root complex 120 may assign a unique address range to each endpoint 140 and each non-transparent endpoint 155 in the bus hierarchy domain 125. Moreover, each endpoint device in a hierarchical level of the tree structure topology in the bus hierarchy domain 125 does not provide access to any other devices in the bus hierarchy domain 125 and does not provide access to any addresses in the address space of the bus hierarchy domain 125 other than the unique addresses assigned to the endpoint device by the root complex 120 of the bus hierarchy domain 125. In this way, the endpoint device terminates the tree structure topology of the bus hierarchy domain 125 in the hierarchical level containing the endpoint device. Although a non-transparent endpoint 155 terminates the hierarchical level containing the non-transparent endpoint 155 in the tree structure topology of a bus hierarchy domain 125, the non-transparent endpoint 155 provides access to the address space of another bus hierarchy domain 125 through one or more of the addresses of the non-transparent endpoint 155 (e.g., the unique address range in the address space of the bus hierarchy domain 125 assigned to the non-transparent endpoint 155).

In various embodiments, a source non-transparent endpoint 155 in a source bus hierarchy domain 125 receives a request packet including a destination address and a requester identifier from a source device (e.g., a switch 135) in the source bus hierarchy domain 125. For example, the destination address in the request packet may identify the non-transparent endpoint 155 as a destination of the request packet. The requester identifier in the request packet identifies the source device (e.g., the switch 135) of the packet. The non-transparent endpoint 155 identifies a destination bus hierarchy domain 125 based on the destination address, generates a translated address in the destination bus hierarchy domain 125 based on the destination address, and translates the requester identifier to a translated requester identifier. Additionally, the source non-transparent endpoint 155 generates a translated request packet including the translated address and the translated requester identifier. The translated address in the translated request packet identifies a destination device in the destination bus hierarchy domain 125. The translated requester identifier in the translated request packet identifies the source non-transparent endpoint 155 as a source of the translated request packet. For example, the translated requester identifier may identify the source non-transparent endpoint 155 as a source of the translated request packet by identifying the source port 150 including the source non-transparent endpoint 155 or the source bus hierarchy domain 125 including the source non-transparent endpoint 155.

In some embodiments, the source non-transparent endpoint 155 generates the translated request packet based on the request packet received at the source non-transparent endpoint 155 by replacing the destination address in the request packet with the translated destination address. In this way, the translated request packet is substantially similar to the request packet. For example, the source non-transparent endpoint 155 may generate a copy of the request packet and replace the destination address in the copy of the request packet with the translated address. Additionally, the source non-transparent endpoint 155 may modify the contents of a request packet in accordance with a protocol (e.g., transaction layer protocol) for routing the request packet through the PCIe switch 145. For example, the source non-transparent endpoint 155 may update an end-to-end cyclical redundancy check (ECRC) code in the translated request packet to reflect the data changes to the request packet.

The non-transparent interconnect 160 routes the translated request packet to a destination non-transparent endpoint 155 in a destination port 150 of the destination bus hierarchy domain 125. In some embodiments, the source non-transparent endpoint 155 identifies the destination non-transparent endpoint 155 based on the destination address in the request packet by determining a destination domain identifier identifying the destination bus hierarchy domain 125 including the destination non-transparent endpoint 155. Additionally, the source non-transparent endpoint 155 provides the destination domain identifier to the non-transparent interconnect 160 along with the translated request packet. In these embodiments, the non-transparent interconnect 160 routes the translated request packet to the destination non-transparent endpoint 155 based on the destination domain identifier. In some embodiments, the non-transparent interconnect 160 includes a switch fabric having a point-to-point switching architecture for routing packets from source ports 150 to destination ports 150. In further embodiments, the switch fabric routes packets between source ports 150 of the PCIe switch 145 and destination ports 150 of the PCIe switch 145 substantially simultaneously.

The destination non-transparent endpoint 155 of the destination port 150 in the destination bus hierarchy domain 125 modifies the translated requester identifier in the translated request packet to identify the destination non-transparent endpoint 155 as a source of the translated request packet. For example, the modified translated requester identifier may identify the destination non-transparent endpoint 155 as a source of the translated request packet by identifying the bus 130 connected to both the destination port 150 and the destination non-transparent endpoint 155 in the destination bus hierarchy domain 125.

In various embodiments, the destination non-transparent endpoint 155 outputs the translated request packet from the destination port 150 in the destination bus hierarchy domain 125 for routing to the destination device identified by the translated address in the destination bus hierarchy domain 125. In further embodiments, the destination bus hierarchy domain 125 routes the translated request packet to the destination device in the destination bus hierarchy domain 125 based on the translated address in the translated request packet. In turn, the destination device in the destination bus hierarchy domain 125 processes the translated request packet.

If the translated request packet is a non-posted packet, the destination device in the destination bus hierarchy domain 125 processes the translated request packet and generates a completion packet in response to receiving the translated request packet. For example, the destination device may perform a memory read operation based on data in the translated request packet and generate the completion packet including data obtained as a result of the read memory operation. Otherwise, if the translated request packet is a posted packet, the destination device need not generate a completion packet in response to receiving the translated request packet. For example, the destination device may perform a memory write operation based on data in the translated request packet.

In various embodiments, the destination device in the destination bus hierarchy domain 125 generates a completion packet in response to receiving a translated request packet that is a non-posted packet. In these embodiments, the completion packet includes the translated requester identifier of the translated request packet and a completer identifier. The completer identifier in the completion packet identifies the destination device as a source of the completion packet. Moreover, the destination device outputs the completion packet and the destination bus hierarchy domain 125 routes the completion to the destination non-transparent endpoint 155 of the destination port 150 in the destination bus hierarchy domain 125 based on the translated requester identifier in the completion packet.

The destination non-transparent endpoint 155 receives the completion packet and identifies both the requester identifier of the request packet and the source non-transparent endpoint 155 in the source bus hierarchy domain 125 based on the translated requester identifier in the completion packet. For example, the destination non-transparent endpoint 155 may identify the source non-transparent endpoint 155 in the source bus hierarchy domain 125 by identifying the source port 150 including the source non-transparent endpoint 155 or the source bus hierarchy domain 125 including the source non-transparent endpoint 155. Additionally, the destination non-transparent endpoint 155 generates a translated completion packet based on the completion packet and including the requester identifier of the request packet.

In some embodiments, the destination non-transparent endpoint 155 generates the translated completion packet based on the completion packet received at the destination non-transparent endpoint 155 by replacing the translated requester identifier in the completion packet with the requester identifier of the request packet. In this way, the translated completion packet is substantially similar to the request packet. For example, the destination non-transparent endpoint 155 may generate a copy of the completion packet and replace the translated destination identifier in the copy of the completion packet with the requester identifier.

The non-transparent interconnect 160 routes the translated completion packet to the source non-transparent endpoint 155 in the source port 150 of the source bus hierarchy domain 125. In some embodiments, the destination non-transparent endpoint 155 identifies the source non-transparent endpoint 155 based on the translated requester identifier in the completion packet by determining a source domain identifier identifying the source bus hierarchy domain 125 including the source non-transparent endpoint 155. Additionally, the destination non-transparent endpoint 155 provides the source domain identifier to the non-transparent interconnect 160 along with the translated completion packet. In these embodiments, the non-transparent interconnect 160 routes the translated completion packet to the source non-transparent endpoint 155 based on the source domain identifier.

The source non-transparent endpoint 155 in the source port 150 of the source bus hierarchy domain 125 modifies the completer identifier in the translated completion packet to identify the source non-transparent endpoint 155 as a source of the translated completion packet. For example, the modified completer identifier may identify the source non-transparent endpoint 155 as a source of the translated completion packet by identifying the bus 130 connected to both the source port 150 and the source non-transparent endpoint 155 in the source bus hierarchy domain 125.

In various embodiments, the source non-transparent endpoint 155 outputs the translated completion packet from the source port 150 in the source bus hierarchy domain 125 for routing to the source device in the source bus hierarchy domain 125 identified by the requester identifier of the translated completion packet. In further embodiments, the source bus hierarchy domain 125 routes the translated completion packet to the source device in the source bus hierarchy domain 125 based on the requester identifier in the translated completion packet. In turn, the source device in the source bus hierarchy domain 125 processes the translated completion packet.

In various embodiments, a source non-transparent endpoint 155 in a source bus hierarchy domain 125 receives a multicast packet including a destination address and a requester identifier from a source device (e.g., a root complex 120) in the source bus hierarchy domain 125. For example, the multicast packet may be a posted packet for performing a memory write operation. The destination address in the multicast packet identifies the non-transparent endpoint 155 as a destination of the multicast packet. The requester identifier in the multicast packet identifies the source device (e.g., the root complex 120) of the packet. In these embodiments, the source non-transparent endpoint 155 identifies more than one destination non-transparent endpoint 155 in more than one destination bus hierarchy domains 125 based on the destination identifier in the multicast packet. Moreover, each of the destination non-transparent endpoints 155 is in a unique one of the destination bus hierarchy domains 125.

In some embodiments, the source non-transparent endpoint 155 identifies a multicast group identifier based on the destination address in the multicast packet. In these embodiments, the multicast group identifier identifies the destination non-transparent endpoints 155 in the destination bus hierarchy domains 125. For example, the multicast group identifier may identify the destination non-transparent endpoints 155 by identifying the destination ports 150 including the destination non-transparent endpoints 155 or the destination bus hierarchy domains 125 including the destination non-transparent endpoints 155.

In some embodiments, the source non-transparent endpoint 155 generates translated addresses based on the destination address. Each of the translated addresses identifies a destination device in a corresponding destination bus hierarchy domain 125 including a destination non-transparent endpoint 155 identified by the multicast group identifier. Additionally, the source non-transparent endpoint 155 generates a translated requester identifier based on the requester identifier in the multicast packet. The translated requester identifier identifies the requester identifier of the multicast packet and the source non-transparent endpoint 155 in the source bus hierarchy domain 125.

In these embodiments, the source non-transparent endpoint 155 generates translated request packets based on the multicast packet, each of which includes a corresponding one of the translated addresses and the translated requester identifier. Moreover, the non-transparent interconnect 160 routes each of the translated request packets to the destination non-transparent endpoint 155 in the corresponding destination bus hierarchy domain 125 including the destination device identified by the translated address in the translated request packet. In further embodiments, each of the destination non-transparent endpoints 155 receiving a translated request packet modifies the requester identifier in the translated request packet to identify the destination non-transparent endpoint 155 (e.g., the destination port 150 including the destination non-transparent endpoint 155). In other embodiments, the source non-transparent endpoint 155 generates each of the translated request packets to include a translated requester identifier identifying the destination non-transparent endpoint 155 of the translated request packet.

In some embodiments, the source non-transparent endpoint 155 generates a translated request packet including a multicast group identifier and the translated requester identifier. In these embodiments, the non-transparent interconnect 160 routes the translated request packet to each of the destination non-transparent endpoints 155. For example, the non-transparent interconnect 160 may route the translated request packet to each of the destination non-transparent endpoints 155 substantially simultaneously. In turn, each of the destination non-transparent endpoints 155 receiving the translated request packet modifies the requester identifier in the translated request packet to identify the destination non-transparent endpoint 155 (e.g., the destination port 150 including the destination non-transparent endpoint 155).

In various embodiments, each of the destination non-transparent endpoints 155 receiving a translated request packet outputs the packet from the port 150 including the destination non-transparent endpoint 155. In further embodiments, each of the destination bus hierarchy domains 125 routes the translated request packet output from the destination non-transparent endpoint 155 in the destination bus hierarchy domain 125 to the destination device identified by the translated address in the translated request packet. In turn, each destination device receiving a translated request packet processes the translated request packet, for example by performing a memory write operation based on data in the translated request packet.

In various embodiments, each of the bus hierarchy domains 125 has an address space addressable by a number of address bits, and the destination address of a request packet has the same number of address bits. Further, a source non-transparent endpoint 155 receiving the request packet generates the translated address of a translated request packet based on the request packet such that translated address includes a number of the address bits in the destination address of the request packet. For example, the most significant address bits of the destination address may include a destination base address and the least significant address bits of the destination address may include an offset. The source non-transparent endpoint 155 identifies a destination bus hierarchy domain 125 as a destination of the translated request packet and generates the translated address of the translated request packet such that the translated address is in the destination bus hierarchy domain 125. For example, the most significant address bits of the translated address may include a translated base address and the least significant address bits of the translated address may include the offset in the destination address.

In these embodiments, the destination base address in the destination address determines an address range in the address space of the bus hierarchy domain 125 including the source non-transparent endpoint 155. For example, the address range determined by the destination base address may include each address in the address space of the bus hierarchy domain 125 having the same most significant bits as the destination base address. Similarly, the translated base address in the translated address determines an address range in the address space of the destination bus hierarchy domain 125. For example, the address range determined by the translated base address may include each address in the address space of the bus hierarchy domain 125 having the same most significant bits as the translated base address.

In various embodiments, the processor 110 of a root module 105 may be any system or device for processing data. For example, the processor 110 may include a central processing unit (CPU), a microprocessor, a microcontroller, an embedded processor, an embedded controller, synchronous logic, asynchronous logic, or the like. The system memory 115 may be may be any system or device for storing data. For example, the system memory 115 may include a random access memory (RAM), a read-only memory (ROM), a flash storage (e.g., flash memory), a disk storage drive, or the like. The root complex 120 may be any system or device for facilitating communication between the processor 110 and the system memory 115, facilitating communication between the processor 110 and the bus hierarchy domain 125 corresponding to the root module 105, or both. In various embodiments, the root complex 120 includes a host bridge and root ports as described in the PCIe Base Specification Revision 2.1. In various embodiments, each of the endpoints 140 and each of the non-transparent endpoints 155 may be any system or device that functions to generate or terminate a peripheral component interconnect express (PCIe) transaction. For example, each of the endpoints 140 and each of the non-transparent endpoints 155 may function as a requester or completer of a peripheral component interconnect express (PCIe) transaction, or both.

In some embodiments, the PCIe switch 145 is implemented in an integrated circuit of an integrated circuit device which may include an integrated circuit package containing the integrated circuit. In some embodiments, the PCIe switch 145 is implemented in more than one integrated circuit of an integrated circuit device which may include a multichip package containing the integrated circuits.

Figure 2:
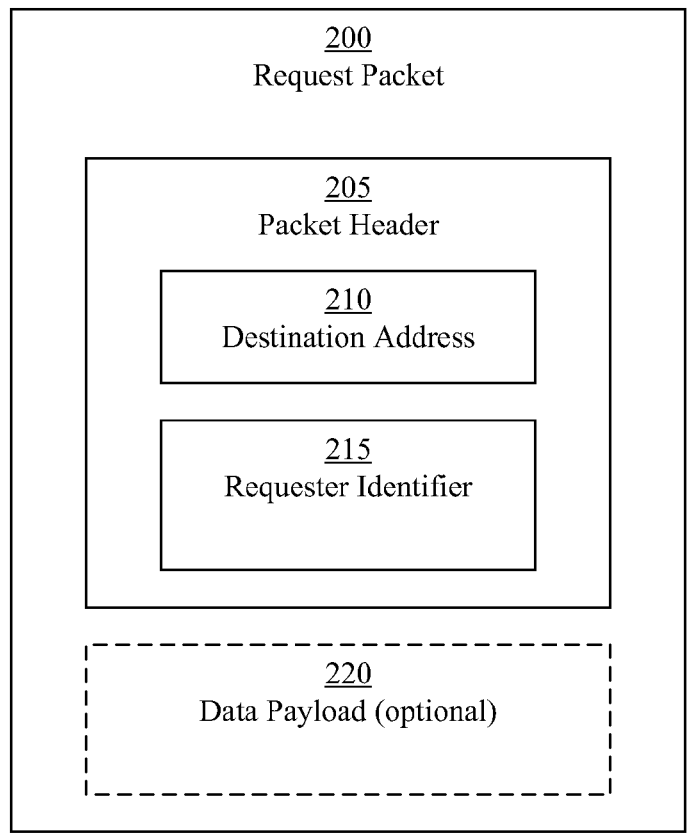
FIG. 2 is a block diagram of a request packet, in accordance with an embodiment of the present invention.

FIG. 2 illustrates a request packet 200, in accordance with an embodiment of the present invention. The request packet 200 includes a packet header 205 and an optional data payload 220. The packet header 205 includes a destination address 210 for identifying a destination of the request packet 200 in a bus hierarchy domain 125. For example, the destination address 210 may identify a destination device in a bus hierarchy domain 125 as a destination of the request packet 200. In some embodiments, the destination identified by the destination address 210 in the request packet 200 is a physical location in the bus hierarchy domain 125. For example, the physical location may be a storage unit of memory device, such as a random access memory (RAM) contained in an endpoint 140 of the bus hierarchy domain 125. In these embodiments, the destination address 210 is in a memory address space of the bus hierarchy domain 125. In some embodiments, the destination identified by the destination address 210 in the request packet 200 is a port of an input/output (I/O) device contained in an endpoint 140 of the bus hierarchy domain 125.

Figure 3:
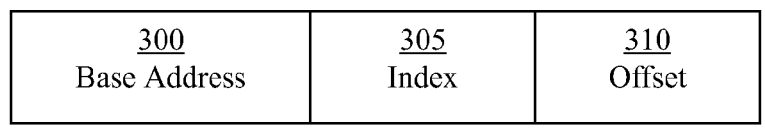
FIG. 3 is a block diagram of a destination address, in accordance with an embodiment of the present invention.

FIG. 3 illustrates a destination address 210, in accordance with an embodiment of the present invention. The destination address 210 includes a base address 300, an index 305, and an offset 310. In various embodiments, a source non-transparent endpoint 155 generates a translated base address based on the base address 300, the index 305, and the offset 310 of a destination address 210, as is described more fully herein.

Figure 4:
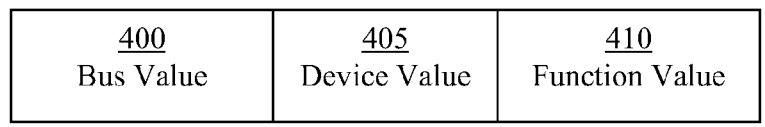
FIG. 4 is a block diagram of a requester identifier, in accordance with an embodiment of the present invention.

FIG. 4 illustrates a requester identifier 215, in accordance with an embodiment of the present invention. The requester identifier 215 includes a bus value 400, a device value 405, and a function value 410. Moreover, the requester identifier 215 identifies a source device in a source bus hierarchy domain 125 of the computing system 100 as a source of packet including the requester identifier 215. In various embodiments, the bus value 400 identifies a bus 130 connected to the source device in a source bus hierarchy domain 125, the device value 405 identifies the source device, and the function value 410 defines one or more functions of the source device. For example, the function of the source device may be an endpoint function. In this example, the source device functions as an endpoint device in the source bus hierarchy domain 125.

Figure 5:
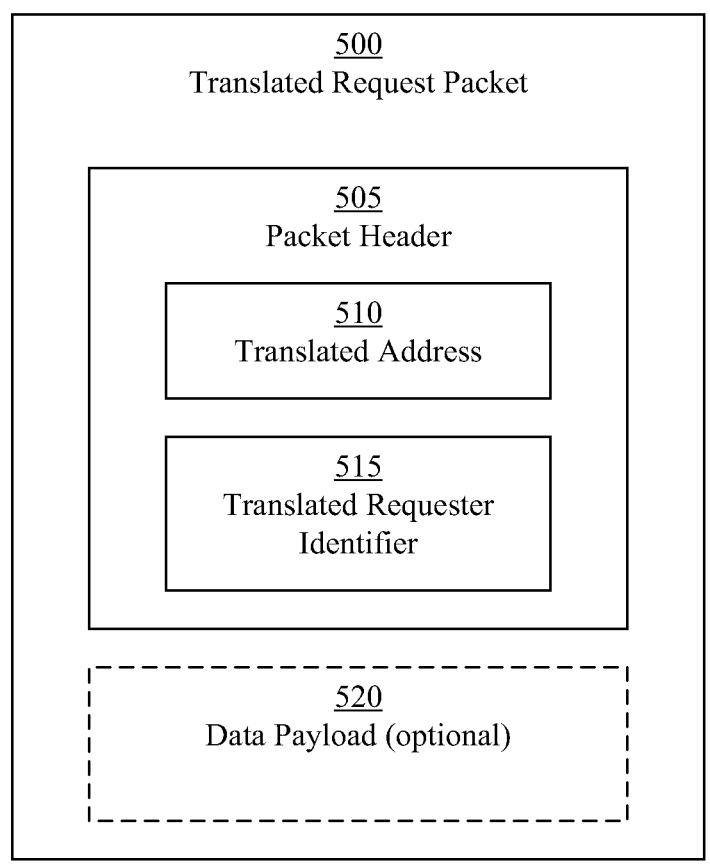
FIG. 5 is a block diagram of a translated request packet, in accordance with an embodiment of the present invention.

FIG. 5 illustrates a translated request packet 500, in accordance with an embodiment of the present invention. The translated request packet 500 includes a packet header 505 and an optional data payload 520. The packet header 505 includes a translated address 510 and a translated requester identifier 515. In various embodiments, a source non-transparent endpoint 155 receives a request packet 200, generates a translated address 510 based on the destination address 210 in the request packet 200, and generates a translated requester identifier 515 based on the requester identifier 215 in the request packet 200. Additionally, the source non-transparent endpoint 155 generates the translated request packet 500 based on the request packet 200 and including the translated address 510 and the translated requester identifier 515.

FIG. 6 illustrates an address translation table 600, in accordance with an embodiment of the present invention. In various embodiments, the PCIe switch 145 maintains the address translation table 600 for translating a destination address 210 in a source bus hierarchy domain 125 to a translated address 510 in a destination bus hierarchy domain 125. In some embodiments, the PCIe switch 145 maintains the address translation table 600 for translating a destination address 210 in a source bus hierarchy domain 125 to two or more translated addresses 510 in corresponding destination bus hierarchy domains 125, as is described more fully herein.

The address translation table 600 includes entries 605, each of which is identified by a corresponding index 305. Each of the entries 605 includes a valid bit 615, a destination domain identifier 620, and a translated base address 625. The valid bit 615 of an entry 605 indicates whether the corresponding destination domain identifier 620 and translated base address 625 in the entry 605 are valid. If the valid bit 615 of an entry 605 is asserted (e.g., set to logical value of one), the corresponding destination domain identifier 620 and translated base address 625 are valid. Otherwise, if the valid bit 615 of the entry 605 is deasserted (e.g., set to a logical value of zero), the corresponding destination domain identifier 620 and translated base address 625 are not valid (i.e., invalid). Moreover, the entry 605 is valid if the valid bit 615 of the entry 605 is asserted.

The destination domain identifier 620 of an entry 605 in the address translation table 600 identifies a destination bus hierarchy domain 125 associated with the entry 605. For example, the destination domain identifier 620 may include a value identifying the destination bus hierarchy domain 125, a value identifying the destination port 150 in the destination bus hierarchy domain 125, or a value identifying the destination non-transparent endpoint 155 of the destination port 150 in the destination bus hierarchy domain 125. In this way, the destination domain identifier 620 identifies the destination bus hierarchy domain 125.

In operation, a source non-transparent endpoint 155 receives a request packet 200 including a destination address 210, identifies an entry 605 in the address translation table 600 based on the index 305 in the destination address 210, and determines whether the entry 605 is valid based on the valid bit 615 in the entry 605. If the entry 605 is valid, the source non-transparent endpoint 155 identifies a destination bus hierarchy domain 125 based on the destination domain identifier 620 in the entry 605. Additionally, the source non-transparent endpoint 155 generates a translated requester identifier 515 based on the requester identifier 215 in the request packet 200 and generates a translated request packet 500 including the translated requester identifier 515. In some embodiments, the source non-transparent endpoint 155 identifies the translated base address 625 in the entry 605 of the address translation table 600 based on the index 305 of the destination address 210. In these embodiments, the source non-transparent endpoint 155 generates a translated address 510 of the translated request packet 500 by combining the translated base address 625 with the offset 310 in the request packet 200. In this way, the source non-transparent endpoint 155 generates the translated address 510 based on the request packet 200. In turn, the non-transparent interconnect 160 routes the translated request packet 500 to the destination non-transparent endpoint 155 associated with the destination bus hierarchy domain 125.

In other embodiments, the source non-transparent endpoint 155 generates the translated request packet 500 including the destination address 210 of the request packet 200 and the translated requester identifier 515. In these embodiments, the destination non-transparent endpoint 155 associated with the destination bus hierarchy domain 125 identifies the translated base address 625 in the entry 605 of the address translation table 600 based on the index 305 of the destination address 210, generates a translated address 510 by combining the translated base address 625 with the offset 310 in the request packet 200, and modifies the translated request packet 500 to include the translated address 510. For example, the destination non-transparent endpoint 155 may modify the translated request packet 500 by replacing the destination address 210 with the translated address 510 in the translated request packet 500. In this way, the destination non-transparent endpoint 155 generates the translated address 510 based on the request packet 200.

FIG. 7 illustrates a translated address 510, in accordance with an embodiment of the present invention. The translated address 510 includes a translated base address 625 and an offset 310 of a destination address 210. In operation, a source non-transparent endpoint 155 identifies the translated base address 625 in the address translation table 600 based on the index 305 of a destination address 210 in a request packet 200. Further, the source non-transparent endpoint 155 combines the translated base address 625 with the offset 310 of the destination address 210, for example by concatenating the translated base address 625 with the offset 310.

In various embodiments, the translated base address 625 includes a number of most significant bits of the translated address 510 and the offset 310 includes a number of least significant bits of the translated address 510. For example, the translated base address 625 may include a number of most significant bits of the translated address 510 and the offset 310 may include the remaining bits of the translated address 510.

FIG. 8 illustrates a requester identifier translation table 800, in accordance with an embodiment of the present invention. In various embodiments, the PCIe switch 145 maintains the requester identifier translation table 800 for translating a requester identifier 215 in a request packet 200 to a translated requester identifier 515 of a translated request packet 500. The requester identifier translation table 800 includes entries 805, each of which is identified by a corresponding index 810. Each of the entries 805 includes a valid bit 815, a source domain identifier 820, a bus value 400, a device value 405, and a function value 410. The valid bit 815 of an entry 805 indicates whether the entry 805 is valid. Moreover, the entry 805 is valid if the entry 805 includes a valid source domain identifier 820, a valid bus value 400, a valid device value 405, and a valid function value 410. Otherwise, the entry 805 is invalid.

The source domain identifier 820 of an entry 805 in the requester identifier translation table 800 identifies a source bus hierarchy domain 125 associated with the entry 805. The bus value 400 identifies a bus 130 in the source bus hierarchy domain 125. The device value 405 identifies a source device in the source bus hierarchy domain 125. The function value 410 identifies a function of the source device in source bus hierarchy domain 125.

In operation, a source non-transparent endpoint 155 in a source bus hierarchy domain 125 receives a request packet 200 including a requester identifier 215 and identifies a source domain identifier 820 identifying the source bus hierarchy domain 125. Additionally, the source non-transparent endpoint 155 identifies the bus value 400, the device value 405, and the function value 410 in the requester identifier 215. Further, the source non-transparent endpoint 155 identifies an entry 805 in the requester identifier translation table 800 including the source domain identifier 820, the bus value 400, the device value 405, and the function value 410. The source non-transparent endpoint 155 determines whether the entry 805 is valid based on the valid bit 815 in the entry 805. If the entry 805 is valid, the source non-transparent endpoint 155 identifies the index 810 of the entry 805 and generates the translated requester identifier 515 such that the translated requester identifier 515 identifies the index 810. In this way, the translated requester identifier 515 identifies the entry 805 in the requester identifier translation table 800.

Because the entry 805 includes the source domain identifier 820 identifying the source bus hierarchy domain 125, the translated requester identifier 515 also identifies the source bus hierarchy domain 125 based on the index 810 in the translated requester identifier 515. Because the entry 805 includes the components of the requester identifier 215 of the request packet 200 (i.e., the bus value 400, device value 405, and function value 410 of the requester identifier 215), the translated requester identifier 515 also identifies the requester identifier 215 of the request packet 200.

FIG. 9 illustrates a translated requester identifier 515, in accordance with an embodiment of the present invention. As illustrated in FIG. 9 the translated requester identifier 515 includes a destination non-transparent endpoint identifier (Destination NT Endpoint Identifier) 900 in addition to an index 810 identifying an entry 805 in the requester identifier translation table 800. The destination non-transparent endpoint identifier 900 in the translated requester identifier 515 identifies a destination non-transparent endpoint 155 in a port 150 associated with a destination bus hierarchy domain 125. For example, the destination non-transparent endpoint identifier 900 may include a value identifying the destination port 150, a value identifying the non-transparent endpoint 155 in the destination port 150, or a value identifying a bus connected to the destination port 150, or some combination thereof.

In operation, a destination non-transparent endpoint 155 receives a translated request packet 500 that includes a translated requester identifier 515 including an index 810. The destination non-transparent endpoint 155 modifies the translated requester identifier 515 in the translated request packet 500 by appending the destination non-transparent endpoint identifier 900 to the index 810 in the translated requester identifier 515. In this way, the destination non-transparent endpoint 155 also modifies the translated request packet 500.

FIG. 10 illustrates a translated requester identifier 515, in accordance with an embodiment of the present invention. The translated requester identifier 515 includes a destination non-transparent endpoint bus value (Destination NT Endpoint Bus Value) 1000, a destination non-transparent endpoint device value (Destination NT Endpoint Device Value) 1005, and a destination non-transparent endpoint function value (Destination NT Endpoint Function Value) 1010. In this embodiment, the translated requester identifier 515 identifies the destination non-transparent endpoint 155 as well as the bus 130 connected to a destination non-transparent endpoint 155 and the function of the destination non-transparent endpoint 155. In various embodiments, the PCIe switch 145 generates the translated requester identifier 515 for multicast packets.

In some embodiments, a destination non-transparent endpoint 155 receives a translated request packet 500 from the non-transparent interconnect 160 and identifies the translated request packet 500 as a multicast packet. Further, the destination non-transparent endpoint 155 modifies the translated requester identifier 515 in the translated request packet 500 to include a destination non-transparent endpoint bus value 1000 identifying the bus 130 connected to the destination non-transparent endpoint 155, a destination non-transparent endpoint device value 1005 identifying the destination non-transparent endpoint 155, and a destination non-transparent endpoint function value 1010 of the destination non-transparent endpoint 155.

In other embodiments, a source non-transparent endpoint 155 in a source bus hierarchy domain 125 receives a request packet 200, identifies the request packet 200 as a multicast packet, and identifies a destination non-transparent endpoint 155 based on the request packet 200. Further, the source non-transparent endpoint 155 generates a translated requester identifier 515 including a destination non-transparent endpoint bus value 1000 identifying the bus 130 connected to the destination non-transparent endpoint 155, a destination non-transparent endpoint device value 1005 identifying the destination non-transparent endpoint 155, and a destination non-transparent endpoint function value 1010 of the destination non-transparent endpoint 155. Additionally, the source non-transparent endpoint 155 generates a translated request packet 500 including the translated requester identifier 515. In turn, the non-transparent interconnect 160 routes the translated request packet 500 to the destination non-transparent endpoint 155.

In some embodiments, a non-transparent endpoint 155 of a source port 150 identifies a destination bus hierarchy domain 125 based on a request packet 200 and forwards the request packet 200 to the non-transparent interconnect 160. In turn, the non-transparent interconnect 160 routes the request packet 200 to a destination non-transparent endpoint 155 associated with the destination bus hierarchy domain 125 and provides a source domain identifier 820 identifying the source bus hierarchy domain 125 to the destination non-transparent endpoint 155. In these embodiments, the destination non-transparent endpoint 155 generates a translated requester identifier 515 identifying the requester identifier 215 in the request packet 200. Additionally, the destination non-transparent endpoint 155 generates a translated request packet 500 including the translated requester identifier 515 as well as a translated address 510.

In further embodiments, the destination non-transparent endpoint 155 generates the translated address 510 based on the destination address 210 in the request packet 200. In some embodiments, the destination non-transparent endpoint 155 includes address translation tables 600 each of which is associated with a corresponding source bus hierarchy domain 125. In these embodiments, the destination non-transparent endpoint 155 identifies an address translation table 600 based on the source domain identifier 820 received from the non-transparent interconnect 160 and generates the translated address 510 based on the identified address translation table 600 and the destination address 210 in the request packet 200, as is described more fully herein.

In other further embodiments, the destination non-transparent endpoint 155 includes an address translation table 600 in which each entry 605 includes a source domain identifier 820. In these embodiments, the destination non-transparent endpoint 155 identifies an entry 605 of the address translation table 600 based on the index 305 of the destination address 210 in the request packet 200 such that the source domain identifier 820 received from the non-transparent interconnect 160 matches the source domain identifier 820 in the entry 605, and a destination domain identifier 620 identifying the destination non-transparent endpoint 155 matches the destination domain identifier 620 in the entry 605. Moreover, the destination non-transparent endpoint 155 generates the translated address 510 based on the identified entry 605 in the address translation table 600 and the destination address 210 in the request packet 200, as is described more fully herein.

In some embodiments, a non-transparent endpoint 155 of a source port 150 in a source bus hierarchy domain 125 identifies a destination bus hierarchy domain 125 based on a request packet 200, generates a translated requester identifier 515 identifying the requester identifier 215 in the request packet 200, and generates a translated request packet 500 including the translated requester identifier 515. Additionally, the non-transparent endpoint 155 forwards the translated request packet 500 to the non-transparent interconnect 160. In turn, the non-transparent interconnect 160 routes the translated request packet 500 to a destination non-transparent endpoint 155 associated with the destination bus hierarchy domain 125. In these embodiments, the destination non-transparent endpoint 155 identifies an entry 805 in a requester identifier table 800 associated with the destination non-transparent endpoint 155 based on the translated requester identifier 515 and identifies the source domain identifier 820 in the entry 805. Additionally, the destination non-transparent endpoint 155 identifies an entry 605 in an address translation table 600 based on the source domain identifier 820 and the index 305 of the destination address 210 in the translated request packet 500, as is described more fully herein. Further, the destination non-transparent endpoint 155 generates a translated address 510 based on the destination address 210 and the entry 605, as is also described more fully herein, and modifies the translated request packet 500 to include the translated address 510. For example, the destination non-transparent endpoint 155 may replace the destination identifier 210 in the translated request packet 500 with the translated address 510.

FIG. 11 illustrates an address translation table 600, in accordance with an embodiment of the present invention. The address translation table 600 includes entries 605, each of which is identified by a corresponding index 305. Each of the entries 605 includes valid bits 615, destination domain identifiers 620 corresponding to the valid bits 615, and translated base address 625 corresponding to the valid bits 615. Each valid bit 615 of an entry 605 indicates whether the corresponding destination domain identifier 620 and translated base address 625 in the entry 605 are valid. If the valid bit 615 of an entry 605 is asserted (e.g., set to logical value of one), the corresponding destination domain identifier 620 and translated base address 625 are valid. Otherwise, if the valid bit 615 of the entry 605 is deasserted (e.g., set to a logical value of zero), the corresponding destination domain identifier 620 and translated base address 625 are not valid (i.e., invalid). Moreover, the entry 605 is valid if at least one valid bit 615 of the entry 605 is asserted.

In operation, a source non-transparent endpoint 155 receives a request packet 200 including a destination address 210, identifies an entry 605 in the address translation table 600 based on the index 305 in the destination address 210, and identifies each valid bit 615 in the entry 605 that indicates the corresponding destination domain identifier 620 and translated base address 625 are valid. For each valid bit 615 in the entry 605 that indicates the corresponding destination domain identifier 620 and translated base address 625 are valid, the source non-transparent endpoint 155 identifies a destination bus hierarchy domain 125 based on the destination domain identifier 620 corresponding to the valid bit 615. Additionally, the source non-transparent endpoint 155 generates a translated requester identifier 515 based on the requester identifier 215 in the request packet 200 and generates a translated request packet 500 including the translated requester identifier 515. If the source non-transparent endpoint 155 identifies more than one valid bit 615 in the entry 605 of the address translation table 600, the source non-transparent endpoint 155 identifies the request packet 200 as a multicast packet.

In some embodiments, the source non-transparent endpoint 155 identifies the translated base address 625 corresponding to the valid bit 615 in the entry 605 of the address translation table 600 based on the index 305 of the destination address 210. In these embodiments, the source non-transparent endpoint 155 generates a translated address 510 of the translated request packet 500 by combining the translated base address 625 with the offset 310 in the request packet 200. In this way, the source non-transparent endpoint 155 generates the translated address 510 based on the request packet 200. In turn, the non-transparent interconnect 160 routes the translated request packet 500 to the destination non-transparent endpoint 155 associated with the destination bus hierarchy domain 125 identified by the destination domain identifier 620 corresponding to the valid bit 615. If the request packet 200 is a multicast packet, the source non-transparent endpoint 155 generates a translated request packet 500 for each valid bit 615 in the entry 605. In turn, the non-transparent interconnect 160 routes each of the translated request packets 500 to the destination non-transparent endpoint 155 associated with the destination bus hierarchy domain 125 identified by the destination domain identifier 620.

In other embodiments, the source non-transparent endpoint 155 generates the translated request packet 500 including the destination address 210 of the request packet 200 and the translated requester identifier 515. In these embodiments, a destination non-transparent endpoint 155 receiving the translated request packet 500 identifies the translated base address 625 in the entry 605 of the address translation table 600 based on the index 305 of the destination address 210, generates a translated address 510 by combining the translated base address 625 corresponding to the valid bit 615 with the offset 310 in the translated request packet 500, and modifies the translated request packet 500 to include the translated address 510. For example, the destination non-transparent endpoint 155 may modify the translated request packet 500 by replacing the destination address 210 with the translated address 510 in the translated request packet 500. In this way, the destination non-transparent endpoint 155 generates the translated address 510 based on the request packet 200.

If the request packet 200 is a multicast packet, the source non-transparent endpoint 155 identifies each destination bus hierarchy domain 125 identified by a valid destination domain identifier 620 in the entry 605. In turn, the non-transparent interconnect 160 routes the translated request packets 500 to the destination non-transparent endpoints 155 associated with the destination bus hierarchy domains 125. Moreover, each of the destination non-transparent endpoint 155 identifies the translated base address 625 in the entry 605 of the address translation table 600 corresponding to the destination domain identifier 620 identifying the bus hierarchy domain 125 associated with the destination non-transparent endpoint 155. Further, the destination non-transparent endpoint 155 generates a translated address 510 by combining the translated base address 625 with the offset 310 in the translated request packet 500, and modifies the translated request packet 500 to include the translated address 510.

In some embodiments, the PCIe switch 145 includes both the address translation table 600 of FIG. 6 and the address translation table 600 of FIG. 11. In these embodiments the address translation table 600 of FIG. 6 is a unicast address translation table and the address translation table 600 of FIG. 11 is a multicast address translation table. Moreover, the PCIe switch 145 identifies a packet as a unicast packet by identifying an entry 605 in the unicast address translation table based on the packet and determining that the valid bit 615 in the entry 605 is asserted. Additionally, the PCIe switch 145 identifies a packet as a multicast packet by identifying an entry 605 in the multicast address translation table based on the packet and determining that at least one valid bit 615 in the entry 605 is asserted.

Figure 12:
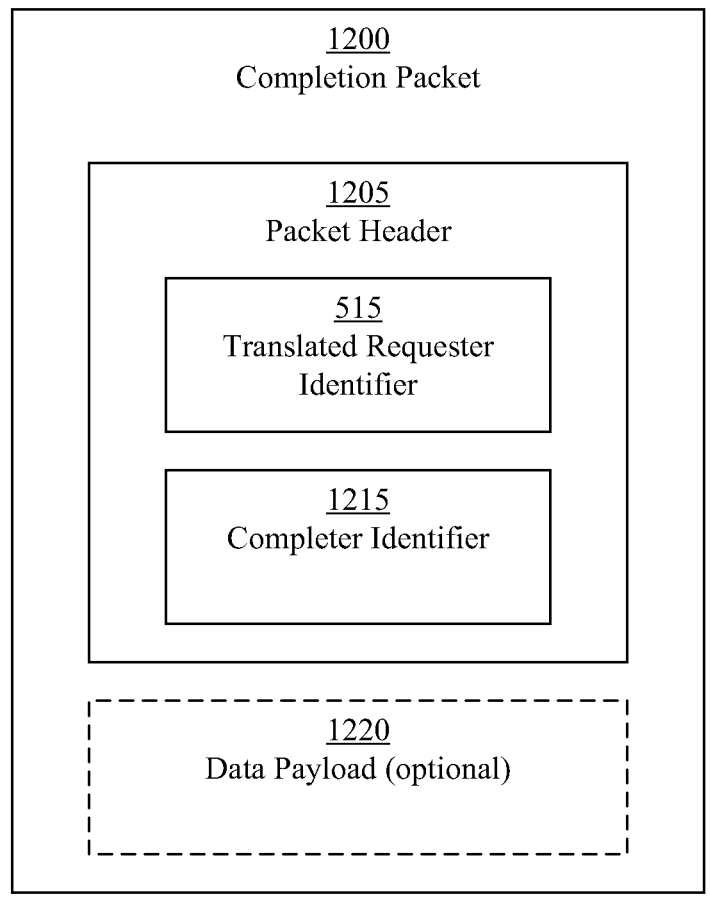
FIG. 12 is a block diagram of a completion packet, in accordance with an embodiment of the present invention.

FIG. 12 illustrates a completion packet 1200, in accordance with an embodiment of the present invention. The completion packet 1200 includes a packet header 1205 and an optional data payload 1220. The packet header 1205 includes a translated requester identifier 515 and a completer identifier 1215. The completer identifier 1215 identifies a destination device in a destination bus hierarchy domain 125 as a source of the completion packet 1200.

In operation, a destination device in the destination bus hierarchy domain 125 receives a translated request packet 500 including a translated requester identifier 515 that includes a destination non-transparent endpoint identifier 900 and an index 810. The destination device generates the completer identifier 1215 such that the completer identifier 1215 identifies the destination device. Additionally, the destination device generates the completion packet 1200 including the translated requester identifier 515 from the translated request packet 500 as well as the completer identifier 1215. The destination device outputs the completion packet 1200 and the destination bus hierarchy domain 125 routes the completion packet 1200 to the destination non-transparent endpoint 155 of the destination port 150 in the destination bus hierarchy domain 125 based on the destination non-transparent endpoint identifier 900 in the translated requester identifier 515 of the completion packet 1200.

Figure 13:
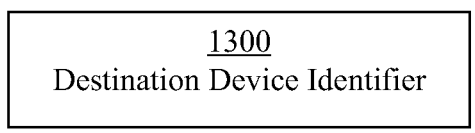
FIG. 13 is a block diagram of a completer identifier, in accordance with an embodiment of the present invention.

FIG. 13 illustrates the completer identifier 1215, in accordance with an embodiment of the present invention. In this embodiment, the completer identifier 1215 includes a destination device identifier 1300 identifying the destination device in the destination bus hierarchy domain 125 that generated the completion packet 1200 including the completer identifier 1215. In operation, the destination device in the destination bus hierarchy domain 125 determines the destination device identifier 1300 that identifies the destination device, and generates the completer identifier 1215 including the destination device identifier 1300.

Figure 14:
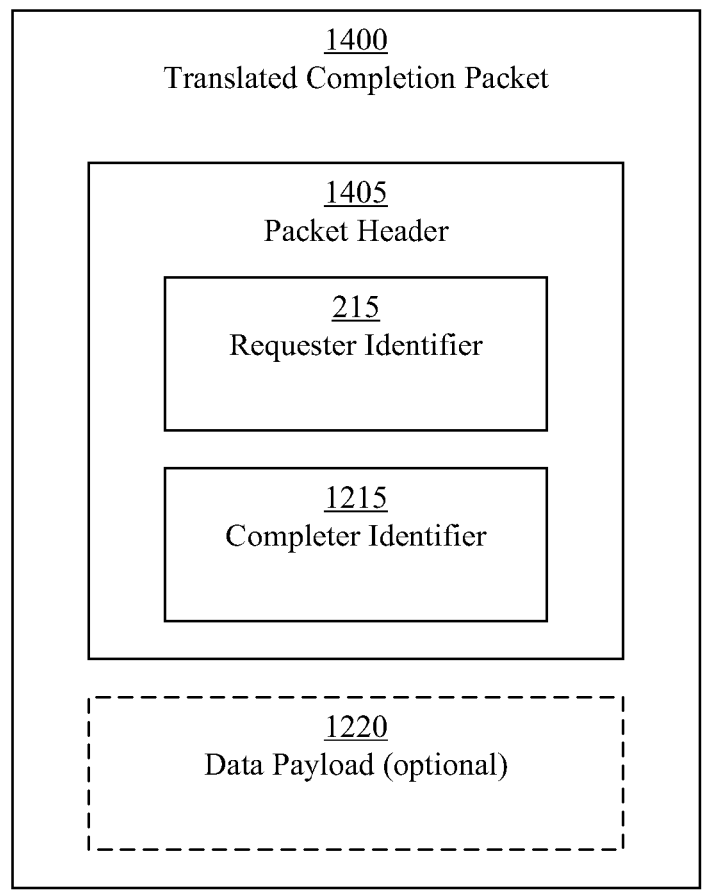
FIG. 14 is a block diagram of a translated completion packet, in accordance with an embodiment of the present invention.

FIG. 14 illustrates a translated completion packet 1400, in accordance with an embodiment of the present invention. The translated completion packet 1400 includes a packet header 1405 and an optional data payload 1220 of a completion packet 1200. The packet header 1405 includes a requester identifier 215 of a request packet 200. In various embodiments, a destination non-transparent endpoint 155 in a destination bus hierarchy domain 125 receives the completion packet 1200 and identifies the requester identifier 215 of the request packet 200 based on the translated requester identifier 515 in the completion packet 1200. For example, the destination non-transparent endpoint 155 identifies the requester identifier 215 by identifying the entry 805 in the requester identifier translation table 800 based on the index 810 in the translated requester identifier 515, and identifying the bus value 400, the device value 405, and the function value 410 of the requester identifier 215 in the entry 805. Further, the destination non-transparent endpoint 155 identifies the source bus hierarchy domain including the source device of the request packet 200 based on the source domain identifier 820 in the entry 805.

Additionally, the destination non-transparent endpoint 155 generates the translated completion packet 1400 based on the completion packet 1200 and including the requester identifier 215 and the completer identifier 1215. In embodiments in which the completion packet 1200 includes a data payload 1220, the destination non-transparent endpoint 155 generates the translated completion packet 1400 including the requester identifier 215, the completer identifier 1215, and the data payload 1220. In one embodiment, the destination non-transparent endpoint 155 generates the translated completion packet 1400 by replacing the translated requester identifier 515 in the completion packet 1200 with the requester identifier 215.

Figure 15:
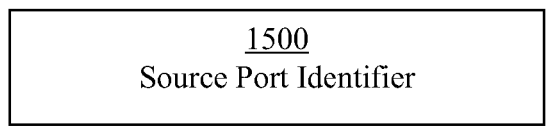
FIG. 15 is a block diagram of completer identifier, in accordance with an embodiment of the present invention.

FIG. 15 illustrates the completer identifier 1215, in accordance with an embodiment of the present invention. In this embodiment, a source non-transparent endpoint 155 in a source port 150 of a source bus hierarchy domain 125 generates the completer identifier 1215 including a source port identifier 1500. The source port identifier 1500 in the completer identifier 1215 identifies the source port 150 in the source bus hierarchy domain 125. For example, the source port identifier 1500 may include a value identifying a bus 130 connected to the source port 150. In further embodiments, the source port identifier 1500 also identifies a function of the source port 150 as a source of the translated completion packet 1400 including the completer identifier 1215. For example, the source port identifier 1500 in the completer identifier 1215 may include a value identifying the source non-transparent endpoint 155 in the source port 150 as a function of the source port 150.

In operation, the source non-transparent endpoint 155 receives a translated completion packet 1400 from a destination non-transparent endpoint 155 through the non-transparent interconnect 160. The translated completion packet 1400 includes a completer identifier 1215 that includes a destination device identifier 1300. The source non-transparent endpoint 155 modifies the completer identifier 1215 in the translated completion packet 1400 by replacing the destination device identifier 1300 with the source port identifier 1500. In this way, the source non-transparent endpoint 155 also modifies the translated completion packet 1400.

Figure 16:
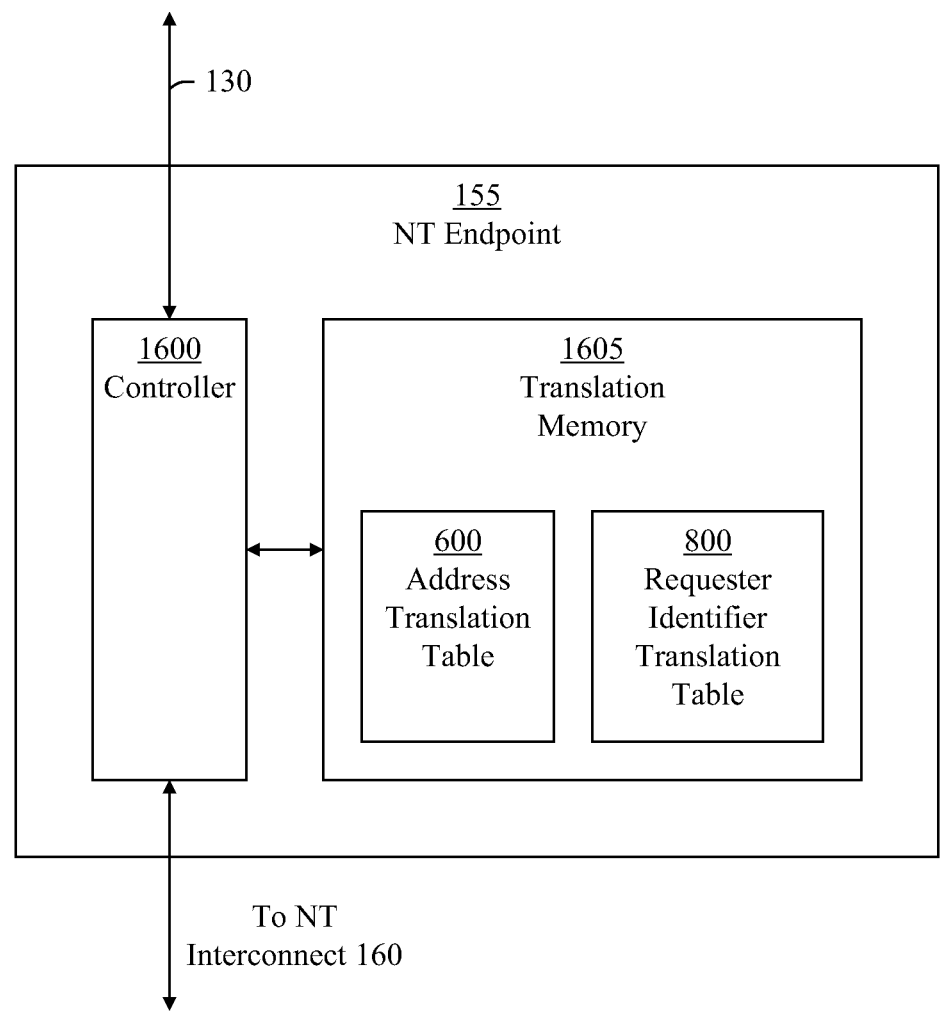
FIG. 16 is a block diagram of a non-transparent endpoint, in accordance with an embodiment of the present invention.

FIG. 16 illustrates the non-transparent endpoint 155, in accordance with an embodiment of the present invention. In this embodiment, the non-transparent endpoint 155 includes a controller 1600 and a translation memory 1605 coupled to the controller 1600. The controller 1600 controls operation of the non-transparent endpoint 155. The translation memory 1605 stores data for generating translated request packets 500 or translated completion packets 1400, or both. As illustrated in FIG. 16, the translation memory 1605 includes the address translation table 600 and the requester identifier translation table 800.

In other embodiments, the PCIe switch 145 includes a global translation memory 1605 in addition to the translation memories 1605 in the non-transparent endpoints 155. In some embodiments, the global translation memory 1605 stores a global requester identifier translation table 800 and the controllers 1600 of the non-transparent endpoints 155 access the global requester identifier translation table 800 in the global translation memory 1605. Because an entry 805 in the global requester identifier translation table 800 includes both a source domain identifier 820 and a requester identifier 215 (i.e., a bus value 400, a device value 405, and a function value 410 of a requester identifier 215), the entry 805 uniquely identifies a source device in a source bus hierarchy domain 125 as a source of a request packet 200 including the requester identifier 215. In some embodiments, the global translation memory 1605 stores a global address translation table 600 and the controllers 1600 of the non-transparent endpoints 155 access the global address translation table 600 in the global translation memory 1605. In some embodiments, the global translation memory 1605 stores both a global address translation table 600 and a global requester identifier translation table 800.

Figure 17:
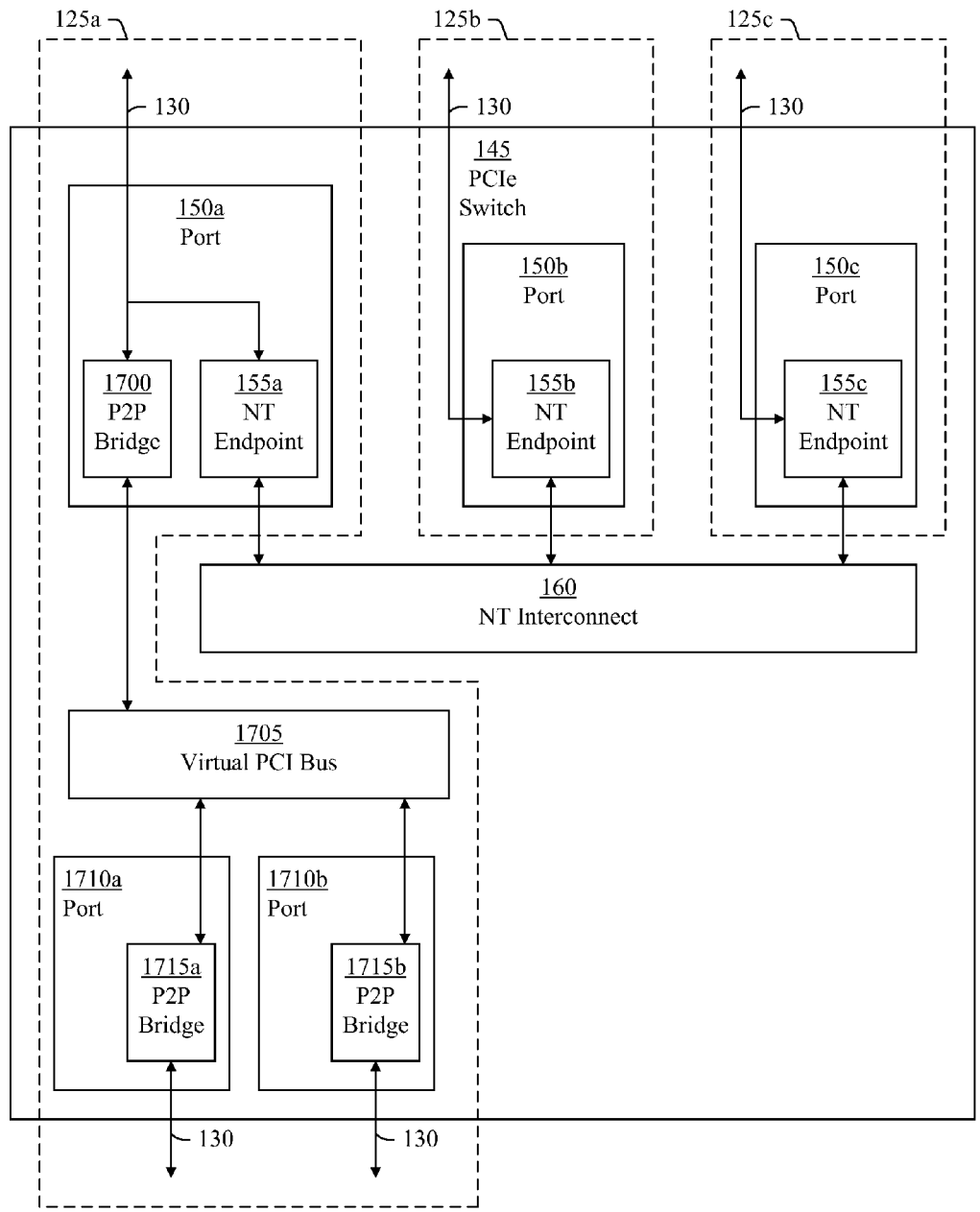
FIG. 17 is a block diagram of a PCIe switch, in accordance with an embodiment of the present invention.

FIG. 17 illustrates the PCIe switch 145, in accordance with an embodiment of the present invention. In this embodiment, the PCIe switch 145 includes three ports 150 (e.g., ports 150*a-c*) and a non-transparent interconnect 160 coupled (e.g., connected) to the ports 150. Additionally, each of the ports 150 in the PCIe switch 145 includes a corresponding non-transparent endpoint 155 (e.g., non-transparent endpoints 155*a-c*). As illustrated in FIG. 17, the port 150*a* includes the non-transparent endpoint 155*a*, the port 150*b* includes the non-transparent endpoint 155*b*, and the port 150*c* includes the non-transparent endpoint 155*c*. Additionally, the port 150*a* includes a PCI-to-PCI bridge (P2P Bridge) 1700 coupled (e.g., connected) to the non-transparent endpoint 155*a* in the port 150*a*. In other embodiments, the PCIe switch 145 may include more than three ports 150 and more than three non-transparent endpoints 155.

The PCIe switch 145 also includes a virtual PCI bus 1705 and one or more ports 1710 (e.g., ports 1710*a-b*). The virtual PCI bus 1705 is coupled (e.g., connected) to the PCI-to-PCI bridge 1700 of the port 150*a* and each of the ports 1710. Each of the ports 1710 includes a PCI-to-PCI bridge 1715 (e.g., PCI-to-PCI bridges 1715*a-b*) coupled (e.g., connected) to the virtual PCI bus 1705. The port 150*a*, the non-transparent endpoint 155*a*, the PCI-to-PCI bridge 1700, the virtual PCI bus 1705, the ports 1710, and the PCI-to-PCI bridges 1715 are associated with the bus hierarchy domain 125*a*. The port 150*b* and the non-transparent endpoint 155*b* are associated with the bus hierarchy domain 125*b*. The port 150*c* and the non-transparent endpoint 155*c* are associated with the bus hierarchy domain 125*c*.

In this embodiment, each of the non-transparent endpoints 155 is a node in the tree structure topology of the bus hierarchy domain 125 associated with non-transparent endpoint 155 when the non-transparent endpoint 155 is in that bus hierarchy domain 125. In this way, the non-transparent endpoint 155 has a hierarchical level in the tree structure topology of the bus hierarchy domain 125 and terminates the tree structure topology in that hierarchical level. In various embodiments, the non-transparent endpoint 155 functions as a requester or completer of a peripheral component interconnect express (PCIe) transaction, as is described more fully herein. In this way, the non-transparent endpoint 155 terminates the tree structure topology of the bus hierarchy domain 125 in the hierarchical level of the non-transparent endpoint 155.

In various embodiments, the non-transparent endpoints 155 communicate with each other though the non-transparent interconnect 160 but the non-transparent interconnect 160 is not associated with any of the bus hierarchy domains 125 in the PCIe switch 145. Furthermore, when a non-transparent endpoint 155 of the PCIe switch 145 is in the bus hierarchy domain 125 associated with the non-transparent endpoint 155, the non-transparent interconnect 160 is not in that bus hierarchy domain 125 because the non-transparent endpoint 155 terminates the tree structure topology of the bus hierarchy domain 125. In this way, the non-transparent interconnect 160 is non-transparent (i.e., not transparent) in the bus hierarchy domain 125. Moreover, the non-transparent endpoint 155 functions to isolate the non-transparent interconnect 160 from the bus hierarchy domain 125.

In operation, the PCI-to-PCI bridge 1700 in the port 150*a* receives a packet from a source device in the source bus hierarchy domain 125*a* through the bus 130*a* or from the non-transparent endpoint 155 of the port 150*a* through the bus 130*a*. For example, the packet may be a request packet 200, a translated request packet 500, a completion packet 1200, or a translated completion packet 1400. As another example, the packet may be a request packet 200 including a destination identifier for identifying multiple destinations for the packet (i.e., a multicast packet). The PCI-to-PCI bridge 1700 determines whether it is a destination of the packet. If the PCI-to-PCI bridge 1700 is a destination of the packet, the PCI-to-PCI bridge 1700 accepts the packet and forwards the packet through the PCI-to-PCI bridge 1700 to the virtual PCI bus 1705. The virtual PCI bus 1705 routes the packet to a port 1710 and the PCI-to-PCI bridge 1715 forwards the packet through the PCI-to-PCI bridge 1715 to the bus 130 coupled to the PCI-to-PCI bridge 1715. In this way, the PCI-to-PCI bridge 1715 outputs the packet from the port 1710.

Additionally, the port 1710 receives a packet and the PCI-to-PCI bridge 1715 of the port 1710 forwards the packet through the PCI-to-PCI bridge 1715 to the virtual PCI bus 1705. The virtual PCI bus 1705 routes the packet to the port 150a coupled to the virtual PCI bus 1705. In turn, the PCI-to-PCI bridge 1700 of the port 150a forwards the packet through the PCI-to-PCI bridge 1700. In turn, the port 150a outputs the packet. For example, the port 150a may output the packet to the bus 130 (e.g., the bus 130d) connected to the port 150a. As another example, the non-transparent endpoint 155a in the port 150a may forward the packet to the non-transparent interconnect 160.

In various embodiments, the non-transparent endpoint 155a in the port 150a associated with the bus hierarchy domain 125a (i.e., the source bus hierarchy domain 125) receives a request packet 200 and identifies one or more of the other bus hierarchy domains 125b-c (e.g., destination bus hierarchy domains 125) as destinations of the request packet 200. In these embodiments, the request packet 200 is a multicast packet. In turn, the non-transparent endpoint 155a generates translated request packets 500 corresponding to the destination bus hierarchy domains 125 based on the request packet 200 and the non-transparent interconnect 160 routes the translated request packet 500 to the corresponding destination bus hierarchy domain 125 (e.g., bus hierarchy domain 125b or 125c).

In further embodiments, the PCI-to-PCI bridge 1700 in the port 150a identifies itself as a destination of the request packet 200. For example, the PCI-to-PCI bridge 1700 may identify the bus hierarchy domain 125a as a destination of the request packet 200 by determining that the destination address 210 in the request packet 200 is in an address range associated with the PCI-to-PCI bridge 1700. Further in this example, the port 150a may include a base limit register for defining the address range associated with the PCI-to-PCI bridge 1700.

Additionally, the PCI-to-PCI bridge 1700 transmits (e.g., forwards) the request packet 200 to the virtual PCI bus 1705 connected to the PCI-to-PCI bridge. In this way, the port 150a multicasts the request packet 200 to the virtual PCI bus 1705 in the bus hierarchy domain 125a (e.g., the source bus hierarchy domain 125a) as well as each destination non-transparent endpoint 155 associated with another bus hierarchy domain 125 (e.g., destination bus hierarchy domains 125b or 125c).

The virtual PCI bus 1705 routes the request packet 200 received from the PCI-to-PCI bridge 1700 to one or more of the ports 1710. The PCI-to-PCI bridge 1715 in the port 1710 receiving the request packet 200 from the virtual PCI bus 1705 transmits (e.g., forwards) the request packet 200 through the PCI-to-PCI bridge 1715 and outputs the request packet 200 from the PCIe switch 145 at the port 1710.

Although only one port 150 includes a PCI-to-PCI bridge 1700 in the PCIe switch 145 illustrated in FIG. 17, more than one port 150 may include a PCI-to-PCI bridge 1700 in other embodiments. In some embodiments, the PCIe switch 145 may include more than one virtual PCI bus 1705, each of which is connected to at least one PCI-to-PCI bridge 1700 (e.g., upstream PCI-to-PCI bridge 1700) and at least one PCI-to-PCI bridge 1715 (e.g., downstream PCI-to-PCI bridge 1715). In various embodiments, the PCI-to-PCI bridge 1700, the non-transparent endpoints 155, the non-transparent interconnect 160, the virtual PCI bus 1705, and the PCI-to-PCI bridges 1715 are logical devices that are physically implemented with logical circuits in the PCIe switch 145.

In some embodiments, the ports 150 of the PCIe switch 145 are upstream ports and the ports 1710 of the PCIe switch 145 are downstream ports. For example, the port 150a may be connected to the bus 130a, the port 150b may be connected to the bus 130f, and the port 150c may be connected to the bus 130h. In some embodiments, the ports 150 of the PCIe switch 145 are downstream ports and the ports 1710 are upstream ports. For example, the port 1710a may be connected to the bus 130a, and the port 1710b may be connected to the bus 130f. In various embodiments, the ports 150 and the ports 1710 are external ports of the PCIe switch 145. In these embodiments, each of the ports 150 and 1710 is connected to a corresponding bus 130 associated with a bus hierarchy domain 125. In some embodiments, one or more of the ports 150 and 1710 is an internal port of the PCIe switch 145, which need not be connected to a bus 130 in a bus hierarchy domain 125.

Figure 18:
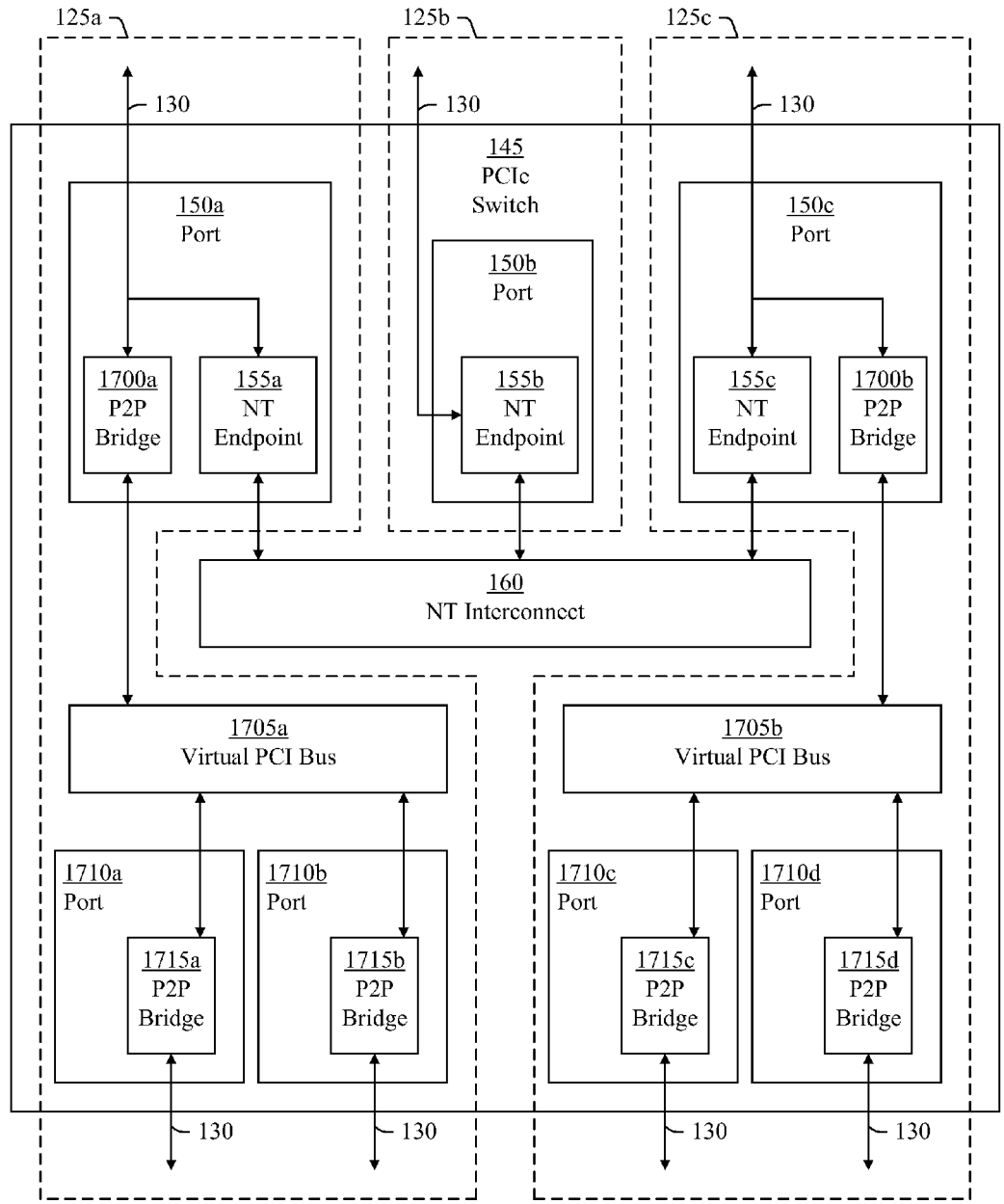
FIG. 18 is a block diagram of a PCIe switch, in accordance with an embodiment of the present invention.

FIG. 18 illustrates the PCIe switch 145, in accordance with an embodiment of the present invention. In this embodiment, the PCIe switch 145 includes three ports 150 (e.g., ports 150a-c) and a non-transparent interconnect 160 coupled (e.g., connected) to the ports 150. Each of the ports 150 in the PCIe switch 145 includes a corresponding non-transparent endpoint 155 (e.g., non-transparent endpoints 155a-c). As illustrated in FIG. 18, the port 150a includes the non-transparent endpoint 155a, the port 150b includes the non-transparent endpoint 155b, and the port 150c includes the non-transparent endpoint 155c.

Additionally, the PCIe switch 145 includes two PCI-to-PCI bridges 1700 (e.g., PCI-to-PCI bridges 1700a and 1700b). The port 150a includes the PCI-to-PCI bridge 1700a, and the port 150c includes the PCI-to-PCI bridge 1700b. Moreover, the PCI-to-PCI bridge 1700a in the port 150a is coupled (e.g., connected) to the non-transparent endpoint 155a in the port 150a through the bus 130 associated with the port 150a. The PCI-to-PCI bridge 1700b in the port 150c is coupled (e.g., connected) to the non-transparent endpoint 155c in the port 150c through the bus 130 associated with the port 150c. In other embodiments, the PCIe switch 145 may include more than three ports 150 and more than three non-transparent endpoints 155. Moreover, the PCIe switch 145 may include more than two PCI-to-PCI bridges 1700 (e.g., upstream PCI-to-PCI bridges 1700) in other embodiments.

The PCIe switch 145 also includes two virtual PCI busses 1705 (e.g., virtual PCI bus 1705a and virtual PCI bus 1705b) and ports 1710 (e.g., ports 1710a-d). Each of the ports 1710 includes a PCI-to-PCI bridge 1715. As illustrated in FIG. 18, the port 1710a includes the PCI-to-PCI bridge 1715a, the port 1710b includes the PCI-to-PCI bridge 1715b, the port 1710c includes the PCI-to-PCI bridge 1715c, and the port 1710d includes the PCI-to-PCI bridge 1715d. Each of the virtual PCI busses 1705 is coupled (e.g., connected) to one or more of the ports 1710 and the PCI-to-PCI bridges 1715 in those ports 1710. As illustrated in FIG. 18, the virtual PCI bus 1705a is coupled to the PCI-to-PCI bridge 1715a, the port 1710a, the PCI-to-PCI bridge 1715b, and the port 1710b. The virtual PCI bus 1705b is coupled to the PCI-to-PCI bridge 1715c, the port 1710c, the PCI-to-PCI bridge 1715d, and the port 1710d.

As illustrated in FIG. 18, the port 150a, the non-transparent endpoint 155a, the PCI-to-PCI bridge 1700a, the virtual PCI bus 1705a, the port 1710a, the port 1710b, the PCI-to-PCI bridge 1715a, and the PCI-to-PCI bridge 1715b are associated with the bus hierarchy domain 125a. The port 150b and the non-transparent endpoint 155b are associated with the bus hierarchy domain 125b. The port 150c, the non-transparent endpoint 155c, the PCI-to-PCI bridge 1700b, the virtual PCI bus 1705b, the port 1710c, the port 1710d, the PCI-to-PCI bridge 1715c, and the PCI-to-PCI bridge 1715d are associated with the bus hierarchy domain 125c. In various embodiments, the PCI-to-PCI bridge 1700, the non-transparent endpoints 155, the non-transparent interconnect 160, the virtual PCI busses 1705, and the PCI-to-PCI bridges 1715 are logical devices that are physically implemented with logical circuits in the PCIe switch 145.

Figure 19:
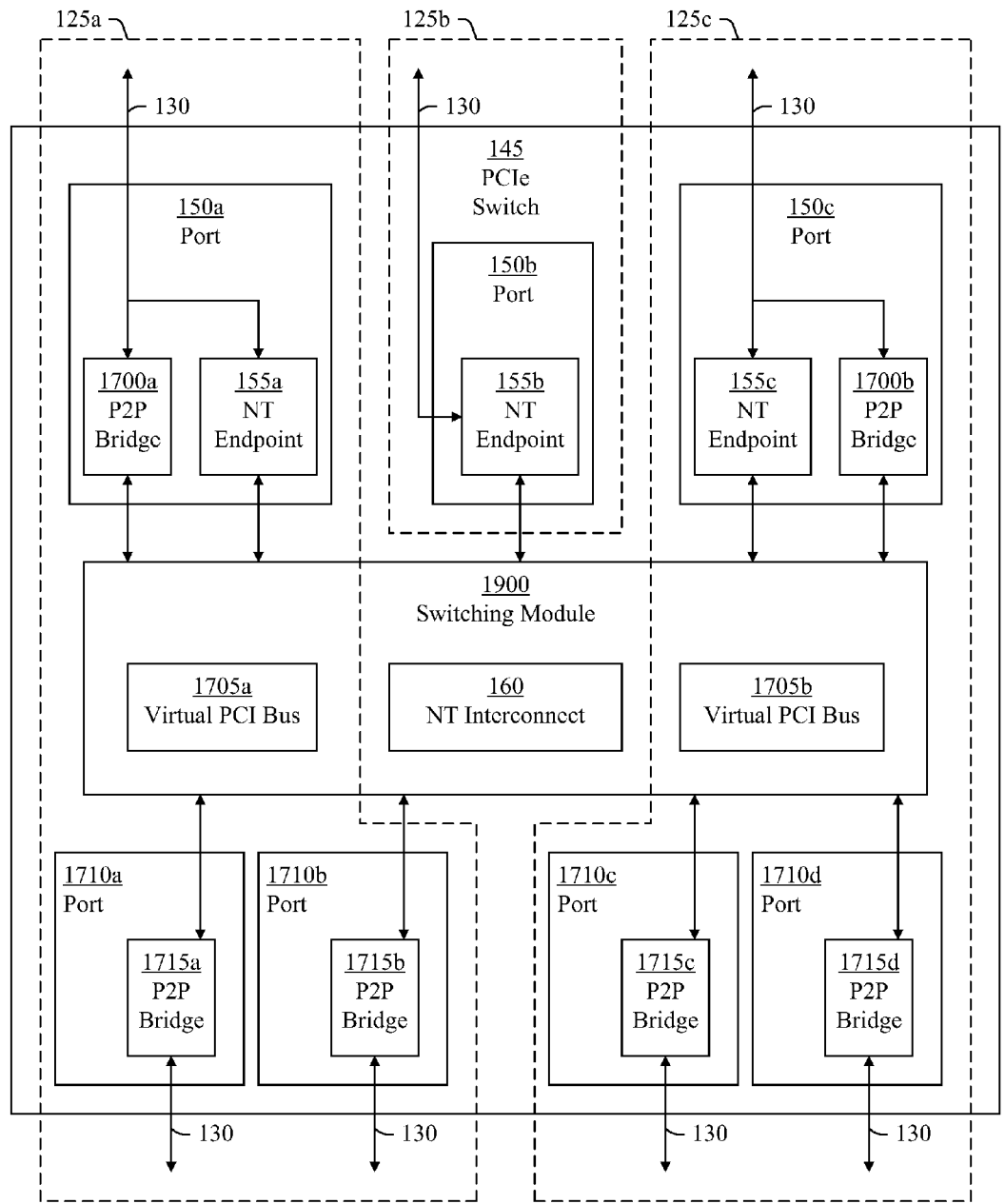
FIG. 19 is a block diagram of a PCIe switch, in accordance with an embodiment of the present invention.

FIG. 19 illustrates the PCIe switch 145, in accordance with an embodiment of the present invention. In this embodiment, the PCIe switch 145 includes the components of the PCIe switch 145 illustrated in FIG. 18 but also includes a switching module 1900. As illustrated in FIG. 19, the switching module 1900 includes the virtual PCI busses 1705a-b and the non-transparent interconnect 160. In this embodiment, the switching module 1900 is a physical device such as a logic circuit, and the virtual PCI busses 1705a-b and the non-transparent interconnect 160 are logical functions in the switching module 1900. In various embodiments, the switching module 1900 is a switch fabric for routing packets, or includes a switch fabric for routing packets.

The switching module 1900 is coupled (e.g., connected) to both the non-transparent endpoint 155a and the PCI-to-PCI bridge 1700a in the port 150a, the non-transparent endpoint 155b in the port 150b, and both the non-transparent endpoint 155c and the PCI-to-PCI bridge 1700b in the port 150c. Additionally, the switching module 1900 is coupled (e.g., connected) to the PCI-to-PCI bridge 1715a in the port 1710a, the PCI-to-PCI bridge 1715b in the port 1710b, the PCI-to-PCI bridge 1715c in the port 1710c, and the PCI-to-PCI bridge 1715d in the port 1710d. Moreover, the switching module 1900 performs the same packet switching function (i.e., routing packets) as the virtual PCI busses 1705a-b and the non-transparent interconnect 160 in the embodiment of FIG. 18. In various embodiments, the switching module 1900 routes packets between components of the PCIe switch 145 (e.g., PCI-to-PCI bridges 1700, non-transparent endpoints 155, and PCI-to-PCI bridges 1715) coupled to the switching module 1900 through point-to-point links (e.g., a switch fabric). In this way, packet latency through the PCIe switch 145 of FIG. 19 is reduced in comparison to packet latency through the PCIe switch 145 of FIG. 18.

For example, the switching module 1900 may route a packet between the non-transparent endpoint 155a in the port 150a and the non-transparent endpoint 155b in the port 150b through a point-to-point link in the switching module 1900. In this way, the switching module 1900 logically routes the packet through the non-transparent interconnect 160a. As another example, the switching module 1900 may route a packet between the PCI-to-PCI bridge 1715a in the port 1710a and the non-transparent endpoint 155a in the port 150a through a point-to-point link in the switching module 1900. In this way, the switching module 1900 logically routes the packet through the virtual PCI bus 1705a.

As still another example, the switching module 1900 may route a packet between the PCI-to-PCI bridge 1715a in the port 1710a and the non-transparent endpoint 155b in the port 150b through a point-to-point link in the switching module 1900. In this way, the switching module 1900 logically routes the packet through the virtual PCI bus 1705a, the PCI-to-PCI bridge 1700a, the non-transparent endpoint 155a, and the non-transparent interconnect 160.

As yet another example, the switching module 1900 may route a packet between the PCI-to-PCI bridge 1715a in the port 1710a and the PCI-to-PCI bridge 1715c in the port 1710c through a point-to-point link in the switching module 1900. In this way, the switching module 1900 logically routes the packet through the virtual PCI bus 1705a, the PCI-to-PCI bridge 1700a, the non-transparent endpoint 155a, the non-transparent interconnect 160, the non-transparent endpoint 155c, the PCI-to-PCI bridge 1700b, and the virtual PCI bus 1705b. In various embodiments, the PCI-to-PCI bridges 1700, the non-transparent endpoints 155, the non-transparent interconnect 160, the virtual PCI buses 1705, and the PCI-to-PCI bridges 1715 are logical devices that are physically implemented with logical circuits in the PCIe switch 145.

Figure 20:
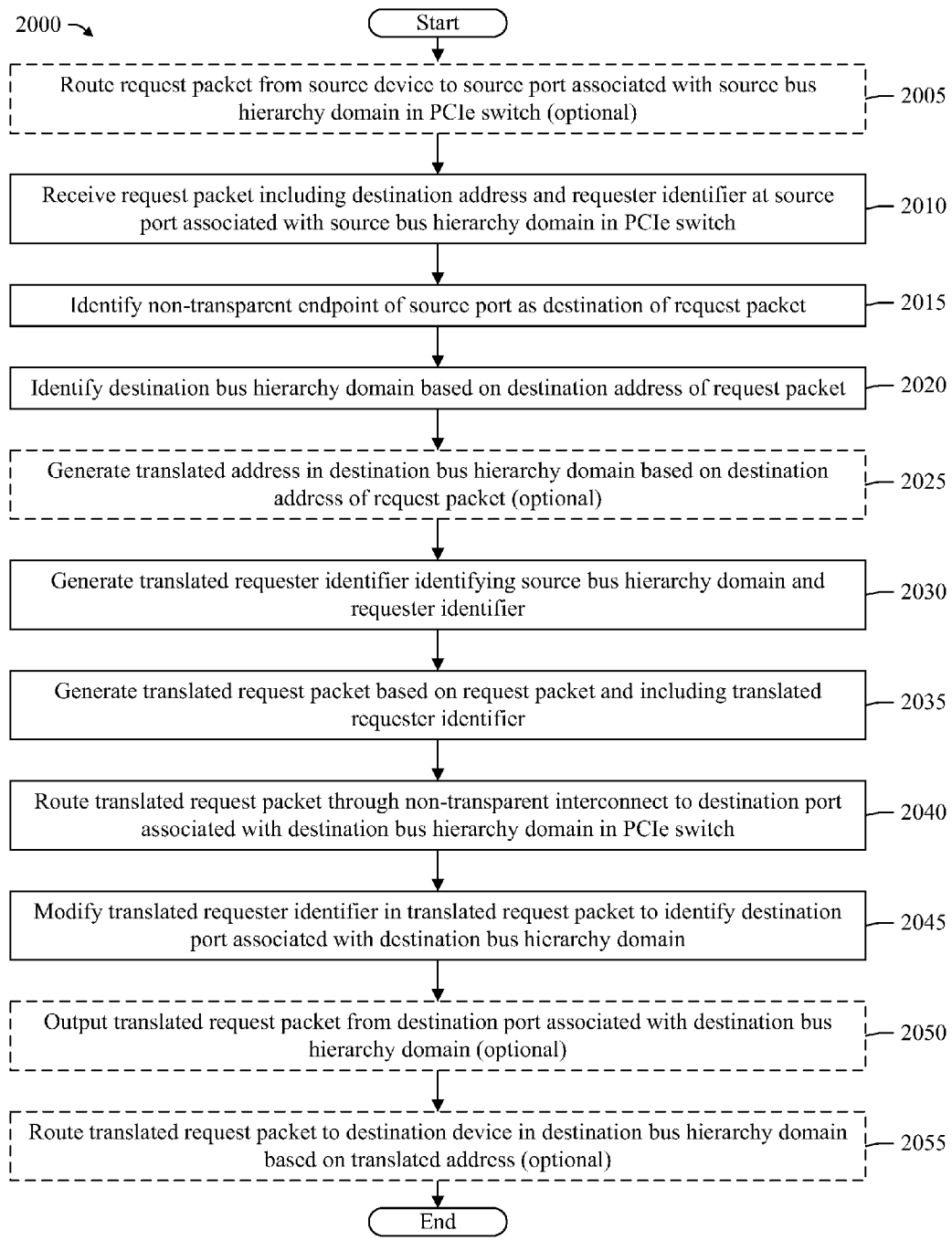
FIG. 20 is a flow chart of a method of routing a packet through a PCIe switch, in accordance with an embodiment of the present invention.

FIG. 20 illustrates a method 2000 for routing a packet through the PCIe switch 145, in accordance with an embodiment of the present invention. In optional step 2005, a request packet is routed from a source device to a source port associated with a source bus hierarchy domain in a PCIe switch. In various embodiments, a source bus hierarchy domain 125 routes a request packet 200 from a source device to a source port 150 associated with the source bus hierarchy domain 125. The method 2000 then proceeds to step 2010.

In step 2010, a request packet including a destination and a requester identifier is received at the source port associated with the source bus hierarchy domain in the PCIe switch. In various embodiments, the source port 150 associated with the source bus hierarchy domain 125 in the PCIe switch 145 receives the request packet 200 including the destination address 210 and the requester identifier 215. The method 2000 then proceeds to step 2015.

In step 2015, the non-transparent endpoint of the source port is identified as a destination of the request packet. In various embodiments, the source port 150 identifies the non-transparent endpoint 155 in the source port 150 as a destination of the request packet 200. For example, the non-transparent endpoint 155 in the source port 150 may determine that the destination address 210 in the request packet 200 is in an address range associated with the non-transparent endpoint 155. Further in this example, the source port 150 may include a base address register for defining the address range associated with the non-transparent endpoint 155. In this way, the non-transparent endpoint 155 of the source port 150 identifies itself as a destination of the request packet 200. The method 2000 then proceeds to step 2020.

In step 2020, a destination bus hierarchy domain is identified based on the destination address of the request packet. In various embodiments, the non-transparent endpoint 155 (e.g., the source non-transparent endpoint 155) in the source port 150 identifies a destination bus hierarchy domain 125 based on the destination address 210 of the request packet 200. The method 2000 then proceeds to step 2025.

In optional step 2025, a translated address is generated in the destination bus hierarchy domain based on the destination address of the request packet. In various embodiments, the non-transparent endpoint 155 in the source port 150 generates a translated address 510 based on the destination address 210 of the request packet 200.

In some embodiments, the source non-transparent endpoint 155 generates the translated address 510 by identifying an entry 605 in the address translation table 600 based on an index 305 in the destination address 210 and combining a translated base address 625 in the entry 605 with an offset 310 in the destination address 210. The method 2000 then proceeds to step 2030.

In step 2030, a translated requester identifier identifying the source bus hierarchy domain and the requester identifier is generated. In various embodiments, the source non-transparent endpoint 155 generates a translated requester identifier 515 based on the requester identifier 215 in the request packet 200. Moreover, the translated requester identifier 515 identifies the source bus hierarchy domain 125 and the requester identifier 215 in the request packet 200.

In some embodiments, the translated requester identifier 515 includes an index 810 identifying an entry 805 in the requester identifier translation table 800. In these embodiments, the entry 805 includes a source domain identifier 820 identifying the source bus hierarchy domain 125 as well as a bus value 400, a device value 405, and a function value 410 which together identify the requester identifier 215 in the request packet 200. In this way, the translated requester identifier 515 identifies the source bus hierarchy domain 125 and the requester identifier 215 in the request packet 200. The method 2000 then proceeds to step 2035.

In step 2035, a translated request packet is generated based on the request packet and including the translated requester identifier. In various embodiments, the source non-transparent endpoint 155 generates a translated request packet 500 based on the request packet 200. Moreover, the translated request packet 500 includes the translated address 510 and the translated requester identifier 515. The method 2000 then proceeds to step 2040.

In step 2040, the translated request packet is routed through a non-transparent interconnect to the destination port associated with the destination bus hierarchy domain in the PCIe switch. In various embodiments, the non-transparent interconnect 160 in the PCIe switch 145 routes the translated request packet 500 to the non-transparent endpoint 155 (i.e., the destination non-transparent endpoint 155) of the destination port 150 associated with the destination bus hierarchy domain 125 in the PCIe switch 145.

In some embodiments, the source non-transparent endpoint 155 identifies an entry 605 in the address translation table 600 based on an index 305 in the destination address 210 and identifies a destination domain identifier 620 identifying the destination bus hierarchy domain 125 in the entry 605. Further, the source non-transparent endpoint 155 provides the destination domain identifier 620 to the non-transparent interconnect 160 along with the translated request packet 500. In turn, the non-transparent interconnect 160 routes the translated request packet 500 to the destination non-transparent endpoint 155 based on the destination domain identifier 620. The method 2000 then proceeds to step 2045.

In step 2045, the translated requester identifier in the translated request packet is modified to identify the destination port associated with the destination bus hierarchy domain. In various embodiments, the destination non-transparent endpoint 155 modifies the translated requester identifier 515 in the translated request packet 500 to identify the destination port 150.

In some embodiments, the destination non-transparent endpoint 155 in the destination port 150 generates a destination non-transparent endpoint identifier 900 identifying the destination non-transparent endpoint 155 and modifies the translated requester identifier 515 by appending the destination non-transparent endpoint identifier 900 to the translated requester identifier 515. As a result, the translated requester identifier 515 includes and the destination non-transparent endpoint identifier 900 identifying the destination non-transparent endpoint 155 as well as the index 810 identifying the source bus hierarchy domain 125 and the requester identifier 215 of the request packet 200. In this way, the destination non-transparent endpoint 155 modifies the translated requester identifier 515 in the translated request packet 500 to identify the destination port 150.

In some embodiments, the destination non-transparent endpoint identifier 900 identifies the bus 130 coupled to the destination non-transparent endpoint 155. In this way, destination non-transparent endpoint identifier 900 identifies the destination port 150 as well as the destination non-transparent endpoint 155 in the destination port 150. The method 2000 then proceeds to step 2050.

In optional step 2050, the translated request packet is output from the destination port associated with the destination bus hierarchy domain. In various embodiments, the destination non-transparent endpoint 155 outputs the translated request packet 500 from the destination port 150. The method 2000 then proceeds to step 2055.

In optional step 2055, the translated request packet is routed to a destination device in the destination bus hierarchy domain based on the translated address. In various embodiments, the destination bus hierarchy domain 125 routes the translated request packet 500 to the destination device based on the translated address 510 in the translated request packet 500. The method 2000 then ends.

In various embodiments, the method 2000 may include more or fewer than the steps 2005-2055 illustrated in FIG. 20 and described above. In some embodiments, the steps 2005-2055 of the method 2000 may be performed in a different order than the order illustrated in FIG. 20 and described above. In some embodiments, some of the steps 2005-2055 of the method 2000 may be performed in parallel or substantially simultaneously. In various embodiments, one or more of the steps 2005-2055 may be performed more than once in the method 2000.

Figure 21:
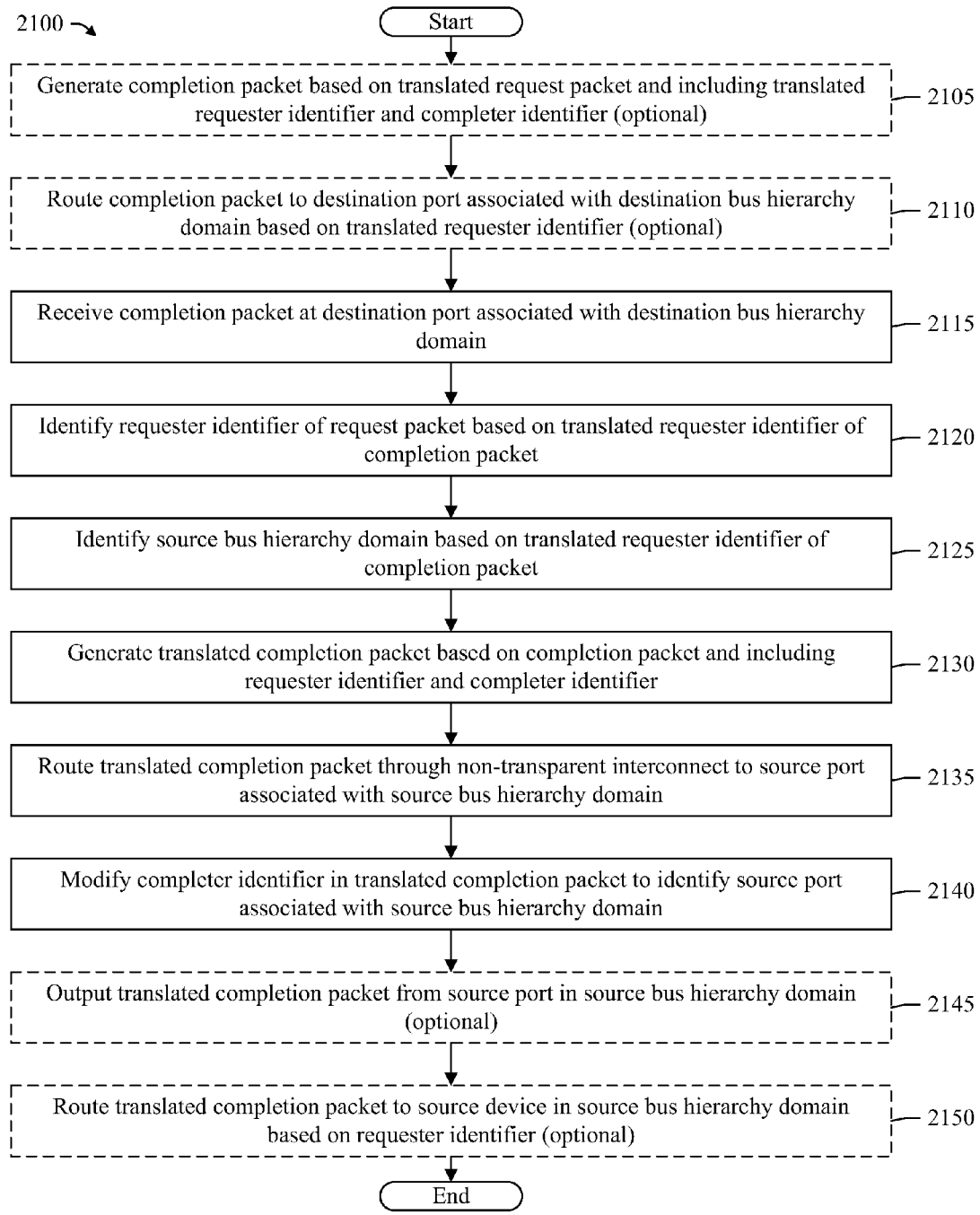
FIG. 21 is a flow chart of a portion of a method of routing a packet through a PCIe switch, in accordance with an embodiment of the present invention.

FIG. 21 illustrates a portion of a method 2100 for routing a packet through the PCIe switch 145, in accordance with an embodiment of the present invention. In various embodiments, the portion of the method 2100 is part of the method 2000 of FIG. 20 and follows step 2045, step 2050, or step 2055 of the method 200. In optional step 2105, a completion packet is generated based on a translated request packet and including the translated requester identifier and the completer identifier. In various embodiments, a destination device in the destination bus hierarchy domain 125 receiving the translated request packet 500 generates a completion packet 1200 based on the translated request packet 500. Moreover, the completion packet 1200 includes the translated requester identifier 515 in the translated request packet 500 and a completer identifier 1215 identifying the destination device. For example, the completer identifier 1215 may include a destination device identifier 1300 identifying the destination device. The portion of the method 2100 then proceeds to optional step 2110.

In optional step 2110, the completion packet is routed to the destination port associated with the destination bus hierarchy domain, based on the translated requester identifier. In various embodiments, the destination bus hierarchy domain 125 routes the completion packet 1200 to the non-transparent endpoint 155 (i.e., destination non-transparent endpoint 155) in the destination port 150 associated with the destination bus hierarchy domain 125 based on the destination non-transparent endpoint identifier 900 in the translated requester identifier 515 of the completion packet 1200. The portion of the method 2100 then proceeds to step 2115.

In step 2115, the completion packet is received at the destination port associated with the destination bus hierarchy domain 125. In various embodiments, the destination non-transparent endpoint 155 of the destination port 150 receives the completion packet 1200. The portion of the method 2100 then proceeds to step 2120.

In step 2120, the requester identifier of the request packet is identified based on the translated requester identifier. In various embodiments, the destination non-transparent endpoint 155 identifies the requester identifier 215 of the request packet 200 based on the translated requester identifier 515 in the completion packet 1200.

In some embodiments, the destination non-transparent endpoint 155 identifies the requester identifier 215 of the request packet 200 based on an index 810 in the translated requester identifier 515 of the completion packet 1200. In these embodiments, the destination non-transparent endpoint 155 identifies an entry 805 in the requester identifier translation table 800 based on the index 810. Further, the destination non-transparent endpoint 155 identifies a bus value 400, a device value 405, and a function value 410 in the entry 805 which together identify the requester identifier 215 in the request packet 200. In this way, the destination non-transparent endpoint 155 identifies the requester identifier 215 of the request packet 200 based on the translated requester identifier 515 of the completion packet 1200. The portion of the method 2100 then proceeds to step 2125.

In step 2125, the source bus hierarchy domain is identified based on the translated requester identifier of the completion packet. In various embodiments, the destination non-transparent endpoint 155 identifies the source non-transparent endpoint 155 based on the translated requester identifier 515 of the completion packet 1200.

In some embodiments, the destination non-transparent endpoint 155 identifies the source bus hierarchy domain 125 based on an index 810 in the translated requester identifier 515 of the completion packet 1200. In these embodiments, the destination non-transparent endpoint 155 identifies an entry 805 in the requester identifier translation table 800 based on the index 810. Further, the destination non-transparent endpoint 155 identifies the source bus hierarchy domain 125 based on the source domain identifier 820 in the entry 805. In this way, the destination non-transparent endpoint 155 identifies the source bus hierarchy domain 125 based on the translated requester identifier 515 of the completion packet 1200. The portion of the method 2100 then proceeds to step 2130.

In step 2130, a translated completion packet is generated based on the completion packet and including the requester identifier and the completer identifier. In various embodiments, the source non-transparent endpoint 155 generates a translated completion packet 1400 based on the completion packet 1200. Moreover, the translated completion packet 1400 includes the requester identifier 215 and the completer identifier 1215. The portion of the method 2100 then proceeds to step 2135.

In step 2135, the translated completion packet is routed through the non-transparent interconnect to the source port associated with the source bus hierarchy domain. In various embodiments, the non-transparent interconnect 160 in the PCIe switch 145 routes the translated completion packet 1400 to the source non-transparent endpoint 155 of the source port 150 associated with the source bus hierarchy domain 125.

In some embodiments, the destination non-transparent endpoint 155 provides a source domain identifier 820 identifying the source bus hierarchy domain 125 to the non-transparent interconnect 160 along with the translated completion packet 1400. For example, the destination non-transparent endpoint 155 may identify an entry 805 in the requester identifier translation table 800 based on the translated requester identifier 515 in the translated completion packet 1400 and identify the source domain identifier 820 in the entry 805. Further in these embodiments, the non-transparent interconnect 160 routes the translated completion packet 1400 to the source non-transparent endpoint 155 based on the source domain identifier 820. The portion of the method 2100 then proceeds to step 2140.

In step 2140, the completer identifier is modified in the translated completion packet to identify the source port associated with the source bus hierarchy domain. In various embodiments, the source non-transparent endpoint 155 in the source port 150 associated with the source bus hierarchy domain 125 modifies the completer identifier 1215 in the translated completion packet 1400 to identify the source port 150.

In some embodiments, the source non-transparent endpoint 155 generates a source port identifier 1500 identifying the source port 150 and modifies the completer identifier 1215 in the translated completion packet 1400 to include the source port identifier 1500. In this way, the source non-transparent endpoint 155 modifies the completer identifier 1215 in the translated completion packet 1400 to identify the source port 150. The portion of the method 2100 then proceeds to step 2145.

In optional step 2145, the translated completion packet is output from the source port in the source bus hierarchy domain. In various embodiments, the source non-transparent endpoint 155 of the source port 150 outputs the translated completion packet 1400 from the source port 150. The portion of the method 2100 then proceeds to step 2150.

In optional step 2150, the translated completion packet is routed to the source device in the source bus hierarchy domain based on the requester identifier. In various embodiments, the source bus hierarchy domain 125 routes the translated completion packet 1400 to the source device based on the requester identifier 215 in the translated completion packet 1400. In this way, the source bus hierarchy domain 125 routes the translated completion packet 1400 to the source device that generated the request packet 200 including the requester identifier 215. The portion of the method 2100 then ends.

In various embodiments, the portion of the method 2100 may include more or fewer than the steps 2105-2150 illustrated in FIG. 21 and described above. In some embodiments, the steps 2105-2150 of the portion of the method 2100 may be performed in a different order than the order illustrated in FIG. 21 and described above. In some embodiments, some of the steps 2105-2150 of the portion of the method 2100 may be performed in parallel or substantially simultaneously. In various embodiments, one or more of the steps 2105-2150 may be performed more than once in the portion of the method 2100.

Figure 22:
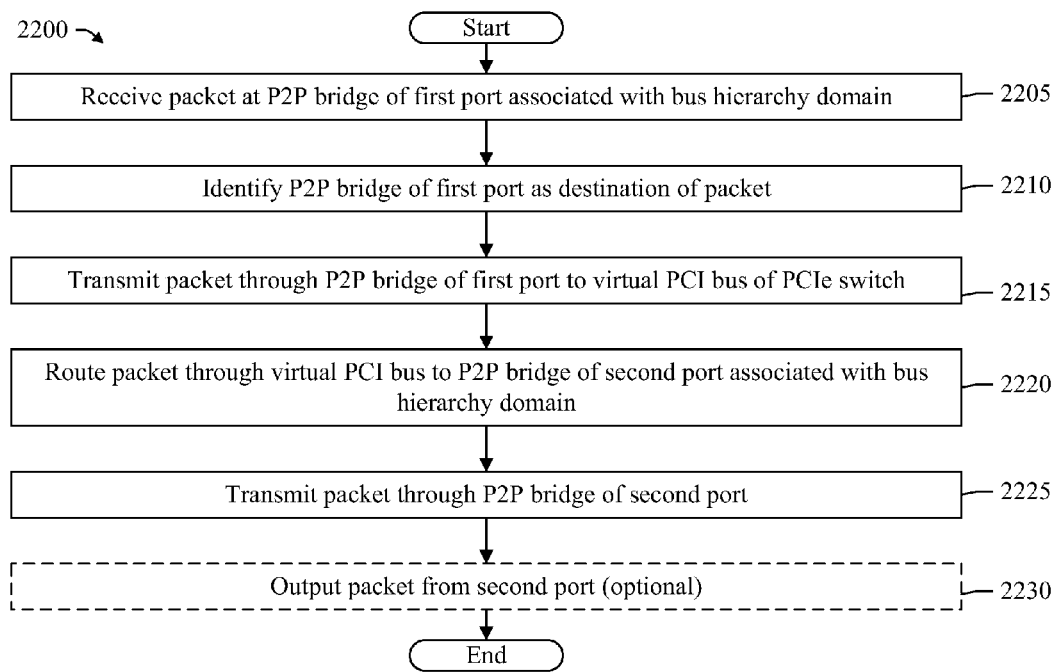
FIG. 22 is a flow chart of a portion of a method of routing a packet through a PCIe switch, in accordance with an embodiment of the present invention.

FIG. 22 illustrates a portion of a method 2200 for routing a packet through the PCIe switch 145, in accordance with an embodiment of the present invention. In various embodiments, the portion of the method 2200 is part of the method 2000 illustrated in FIG. 20. In some embodiments, the portion of the method 2200 may follow step 2045, step 2050, or step 2055 of the method 2000. In some embodiments, the portion of the method 2200 may follow step 2140, step 2145, or step 2150 of the portion of the method 2100.

In step 2205, a packet is received at the PCI-to-PCI bridge of a first port associated with a bus hierarchy domain. In various embodiments, the PCI-to-PCI bridge 1700 of a first port 150 associated with a bus hierarchy domain 125 receives the packet. In some embodiments, the PCI-to-PCI bridge 1700 of the first port 150 receives the packet from the non-transparent endpoint 155 of the first port 150. For example, the PCI-to-PCI bridge 1700 may receive a translated request packet 500 from the non-transparent endpoint 155. As another example, the PCI-to-PCI bridge 1700 may receive a translated completion packet 1400 from the non-transparent endpoint 155. The portion of the method 2200 then proceeds to step 2210.

In step 2210, the PCI-to-PCI bridge of the first port is identified as a destination of the packet. In various embodiments, the first port 150 identifies the PCI-to-PCI bridge 1700 in the first port 150 as a destination of the packet. For example, the PCI-to-PCI bridge 1700 may determine that a destination address 210 in the packet is in an address range associated with the PCI-to-PCI bridge 1700. As another example, the PCI-to-PCI bridge 1700 may determine that a translated address 510 in the packet is in an address range associated with the PCI-to-PCI bridge 1700. In this way, the PCI-to-PCI bridge 1700 identifies itself as a destination of the packet. The portion of the method 2200 then proceeds to step 2215.

In step 2215, the packet is transmitted through the PCI-to-PCI bridge of the first port to a virtual PCI bus of the PCIe switch. In various embodiments, the PCI-to-PCI bridge 1700 of the first port 150 transmits the packet to a virtual PCI bus 1705 coupled to the PCI-to-PCI bridge 1700 in the PCIe switch 145. The portion of the method 2200 then proceeds to step 2220.

In step 2220, the packet is routed through the virtual PCI bus to a PCI-to-PCI bridge of a second port associated with the bus hierarchy. In various embodiments, the virtual PCI bus 1705 routes the packet to a PCI-to-PCI bridge 1715 of a second port 1710 coupled to the virtual PCI bus 1705 and associated with the bus hierarchy domain 125. The portion of the method 2200 then proceeds to step 2225.

In step 2225, the packet is transmitted through the PCI-to-PCI bridge of the second port. In various embodiments, the PCI-to-PCI bridge 1715 of the second port 1710 transmits (e.g., forwards) the packet through the PCI-to-PCI bridge 1715. The portion of the method 2200 then proceeds to step 2230.

In optional step 2230, the packet is output from the second port. In various embodiments, the PCI-to-PCI bridge 1715 of the second port 1710 outputs the packet from the second port 1710. In some embodiments, the PCI-to-PCI bridge 1715 of the second port 1710 outputs the packet from the second port 1710 by outputting the packet from the PCIe switch 145 at the second port 1710. The portion of the method 2200 then ends.

In various embodiments, the portion of the method 2200 may include more or fewer than the steps 2205-2230 illustrated in FIG. 22 and described above. In some embodiments, the steps 2205-2230 of the portion of the method 2200 may be performed in a different order than the order illustrated in FIG. 22 and described above. In some embodiments, some of the steps 2205-2230 of the portion of the method 2200 may be performed in parallel or substantially simultaneously. In various embodiments, one or more of the steps 2205-2230 may be performed more than once in the portion of the method 2200.

Figure 23:
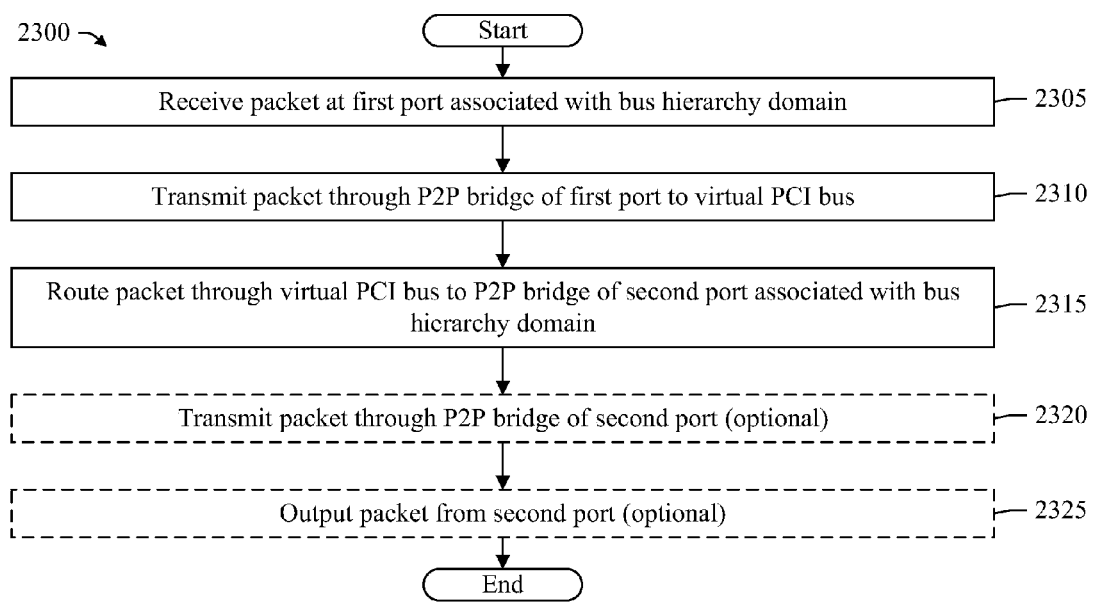
FIG. 23 is a flow chart of a portion of a method of routing a packet through a PCIe switch, in accordance with an embodiment of the present invention.

FIG. 23 illustrates a portion of a method 2300 for routing a packet through the PCIe switch 145, in accordance with an embodiment of the present invention. In various embodiments, the portion of the method 2300 is part of the method 2000 illustrated in FIG. 20 or part of the method 2100 illustrated in FIG. 21. In some embodiments, the step 2005 of the method 2000 may include the portion of the method 2300. In some embodiments, the step 2110 of the method 2100 may include the portion of the method 2300.

In step 2305, a packet is received at a first port associated with a bus hierarchy domain. In various embodiments, a first port 1710 associated with a bus hierarchy domain 125 receives the packet. For example, the first port 1710 may receive a request packet 200 from a source device in the bus hierarchy domain 125. As another example, the first port 1710 may receive a completion packet 1200 from a destination device in the bus hierarchy domain 125. The portion of the method 2300 then proceeds to step 2310.

In step 2310, the packet is transmitted through a PCI-to-PCI bridge of the first port to a virtual PCI bus. In various embodiments, the PCI-to-PCI bridge 1715 in the first port 1710 transmits the packet to a virtual PCI bus 1705 coupled to the PCI-to-PCI bridge 1715. The portion of the method 2300 then proceeds to step 2315.

In step 2315, the packet is routed through the virtual PCI bus to a PCI-to-PCI bridge of a second port associated with the bus hierarchy domain. In various embodiments, the virtual PCI bus 1705 receiving the packet from the PCI-to-PCI bridge 1715 of the port 1710 routes the packet through the virtual PCI bus 1705 to the PCI-to-PCI bridge 1700 of a second port 150 coupled to the virtual PCI bus 1705. The portion of the method 2300 then proceeds to step 2320.

In optional step 2320, the packet is transmitted through the PCI-to-PCI bridge of the second port. In various embodiments, the PCI-to-PCI bridge 1700 of the second port 150 transmits the packet through the PCI-to-PCI bridge 1700 to the bus 130 connected to the second port 150. The portion of the method 2300 then proceeds to step 2325.

In optional step 2325, the packet is output from the second port. In various embodiments, the non-transparent endpoint 155 in the second port 150 associated with the bus hierarchy domain 125 outputs the packet from the second port 150. For example, non-transparent endpoint 155 may output the packet from the second port 150 by providing the packet to the non-transparent interconnect 160. As another example, the PCI-to-PCI bridge 1700 in the second port 150 may output the packet from the second port 150 by transmitting the packet on the bus 130 connected to both the PCI-to-PCI bridge 1700 and the non-transparent endpoint 155 in the second port 150. The portion of the method 2300 then ends.

In various embodiments, the portion of the method 2300 may include more or fewer than the steps 2305-2325 illustrated in FIG. 23 and described above. In some embodiments, the steps 2305-2325 of the portion of the method 2300 may be performed in a different order than the order illustrated in FIG. 23 and described above. In some embodiments, some of the steps 2305-2325 of the portion of the method 2300 may be performed in parallel or substantially simultaneously. In various embodiments, one or more of the steps 2305-2325 may be performed more than once in the portion of the method 2300.

Figure 24:
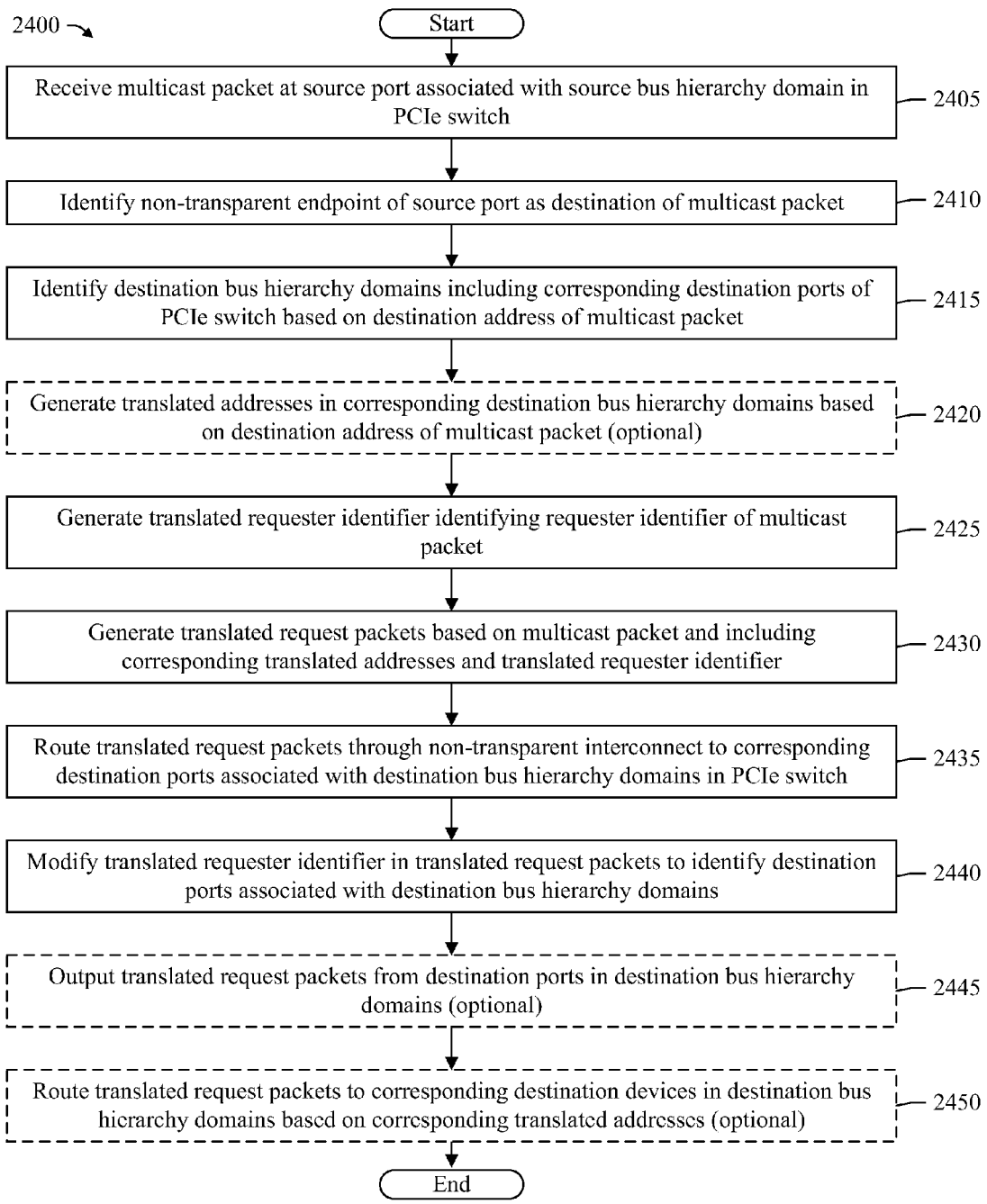
FIG. 24 is a flow chart of a method of routing a multicast packet through a PCIe switch, in accordance with an embodiment of the present invention.

FIG. 24 illustrates a portion of a method 2400 for routing a multicast packet through the PCIe switch 145, in accordance with an embodiment of the present invention. In step 2405, a multicast packet is received at a source port associated with a source bus hierarchy domain in a PCIe switch. In various embodiments, a source port 150 associated with a source bus hierarchy domain 125 in a PCIe switch 145 receives a request packet 200. In these embodiments, the request packet 200 is a multicast packet. The method 2400 then proceeds to step 2410.

In step 2410, the non-transparent endpoint of the source port is identified as a destination of the multicast packet. In various embodiments, the source port 150 identifies the non-transparent endpoint 155 in the port 150 as a destination of the multicast packet. For example, the non-transparent endpoint 155 may determine that the destination address 210 in the multicast packet is in an address range associated with the non-transparent endpoint 155. In this way, the non-transparent endpoint 155 identifies itself as a destination of the multicast packet. The method 2400 then proceeds to step 2415.

In step 2415, destination bus hierarchy domains including corresponding destination ports of the PCIe switch are identified based on a destination address of the multicast packet. In various embodiments, the non-transparent endpoint 155 (e.g., the source non-transparent endpoint 155) in the source port 150 identifies destination bus hierarchy domains 125 including corresponding destination ports 150 of the PCIe switch 145 based on a destination address 210 in the request packet 200. The method 2400 then proceeds to step 2420.

In optional step 2420, translated addresses in corresponding destination bus hierarchy domain are generated based on the destination address of the multicast packet. In various embodiments, the non-transparent endpoint 155 in the source port 150 generates translated addresses 510 in corresponding bus hierarchy domains 125 (i.e., the destination bus hierarchy domains 125) based on the destination address 210 of the request packet 200.

In some embodiments, the source non-transparent endpoint 155 generates the translated addresses 510 by identifying an entry 605 in the address translation table 600 based on an index 305 in the destination address 210 and combining a translated base address 625 in the entry 605 with an offset 310 in the destination address 210. The method 2400 then proceeds to step 2425.

In step 2425, a translated requester identifier identifying the requester identifier of multicast packet is generated. In various embodiments, the source non-transparent endpoint 155 generates a translated requester identifier 515 based on the requester identifier 215 in the request packet 200. Moreover, the translated requester identifier 515 identifies the requester identifier 215 in the request packet 200. In further embodiments, the translated requester identifier 515 also identifies the source bus hierarchy domain 125.

In some embodiments, the translated requester identifier 515 includes an index 810 identifying an entry 805 in the requester identifier translation table 800. In these embodiments, the entry 805 includes a source domain identifier 820 as well as a bus value 400, a device value 405, and a function value 410 which together identify the requester identifier 215 in the request packet 200. In this way, the translated requester identifier 515 identifies the source bus hierarchy domain 125 and the requester identifier 215 in the request packet 200. The method 2400 then proceeds to step 2430.

In step 2430, translated request packets are generated based on the multicast packet and including corresponding translated addresses and the translated requester identifier. In various embodiments, the source non-transparent endpoint 155 generates translated request packets 500 based on the request packet 200. Moreover, each of the translated request packets 500 includes a corresponding one of the translated address 510 as well as the translated requester identifier 515. The method 2400 then proceeds to step 2435.

In step 2435, the translated request packets are routed through a non-transparent interconnect to corresponding destination ports associated with the destination bus hierarchy domains in the PCIe switch. In various embodiments, the non-transparent interconnect 160 in the PCIe switch 145 routes each of the translated request packets 500 to the destination non-transparent endpoint 155 of a corresponding one of the destination ports 150 associated with a destination bus hierarchy domain 125 in the PCIe switch 145.

In some embodiments, the source non-transparent endpoint 155 identifies an entry 605 in the address translation table 600 based on an index 305 in the destination address 210 and identifies destination domain identifiers 620 identifying the destination bus hierarchy domains 125 in the entry 605. Further, the source non-transparent endpoint 155 provides the destination domain identifiers 620 to the non-transparent interconnect 160 along with the translated request packets 500. In turn, the non-transparent interconnect 160 routes the translated request packets 500 to the destination non-transparent endpoints 155 based on the destination domain identifiers 620. The method 2400 then proceeds to step 2440.

In step 2440, the translated requester identifier is modified in the translated request packets to identify the destination ports in the destination bus hierarchy domains. In various embodiments, the destination non-transparent endpoint 155 receiving a translated request packet 500 modifies the translated requester identifier 515 in the translated request packet 500 to identify the destination port 150. The method 2400 then proceeds to step 2445.

In optional step 2445, the translated request packets are output from the destination ports in the destination bus hierarchy domains. In various embodiments, the destination port 150 receiving a translated request packet 500 outputs the translated request packet 500 from the destination port 150. The method 2400 then proceeds to step 2450.

In optional step 2450, the translated request packets are routed to destination devices in the destination bus hierarchy domains based on the corresponding the translated addresses. In various embodiments, the destination bus hierarchy domain 125 receiving a translated request packet 500 routes the translated request packet 500 to the destination device in the destination bus hierarchy domain 125 based on the translated address 510 in the translated request packet 500. The method 2400 then ends.

In various embodiments, the method 2400 includes the portion of the method 2200 illustrated in FIG. 22 or the portion of the method 2300 illustrated in FIG. 23, or both. For example, the step 2405 of the method 2400 may include the portion of the method 2300. As another example, the step 2445 of the method 2400 may include the portion of the method 2200.

In various embodiments, the portion of the method 2400 may include more or fewer than the steps 2405-2450 illustrated in FIG. 24 and described above. In some embodiments, the steps 2405-2450 of the portion of the method 2400 may be performed in a different order than the order illustrated in FIG. 24 and described above. In some embodiments, some of the steps 2405-2450 of the portion of the method 2400 may be performed in parallel or substantially simultaneously. In various embodiments, one or more of the steps 2405-2450 may be performed more than once in the portion of the method 2400.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A PCIe switch for routing peripheral component interconnect express packets, the PCIe switch comprising:
 a plurality of ports including a source port and a plurality of destination ports, the source port comprising a source non-transparent endpoint associated with a source bus hierarchy domain, the source non-transparent endpoint configured to receive a request packet including a destination address and a requester identifier, the PCIe switch configured to identify an entry in an address translation table based on the destination address, the entry including a translated base address and a destination domain identifier identifying a destination bus hierarchy domain from among a plurality of destination bus hierarchy domains, generate a translated requester identifier for identifying the requester identifier and the source bus hierarchy domain, generate a translated address using the translated base address of the entry in the address translation table, and generate a translated request packet based on the request packet, the translated request packet including the translated requester identifier and the translated address; and a non-transparent interconnect coupled to the plurality of ports and configured to route the translated request packet to a destination non-transparent endpoint associated with the destination bus hierarchy domain in a destination port of the plurality of ports based on the destination domain identifier.

2. The PCIe switch of claim 1, wherein the PCIe switch is configured to identify the entry in an address translation table based on an index of the destination address.

3. The PCIe switch of claim 1, wherein the translated address is generated by combining an offset of the destination address with the translated base address of the entry in the address translation table.

4. The PCIe switch of claim 1, wherein, when a completion packet related to the request packet is routed through the PCIe switch, the translated requester identifier is used for identifying the requester identifier and the source bus hierarchy domain.

5. The PCIe switch of claim 1, wherein wherein the translated address comprises the translated base address of the entry in the address translation table.

6. The PCIe switch of claim 1, wherein the destination non-transparent endpoint is configured to generate a translated address in the destination bus hierarchy domain based on the destination address and modify the translated request packet to include the translated address.

7. The PCIe switch of claim 1, wherein the source port further comprises a controller that is configured to identify the entry in an address translation table based on an index of the destination address, generate the translated requester identifier, generate the translated address, and generate the translated request packet.

8. The PCIe switch of claim 1, wherein the destination non-transparent endpoint is further configured to modify the translated requester identifier in the translated request packet to identify the destination port, and the destination port is configured to output the translated request packet for routing to a destination device in the destination bus hierarchy domain.

9. A PCIe switch for routing peripheral component interconnect express packets, the PCIe switch comprising:

a plurality of ports including a source port and a plurality of destination ports, the source port comprising a source non-transparent endpoint associated with a source bus hierarchy domain, the source non-transparent endpoint configured to receive a request packet including a destination address and a requester identifier, wherein the PCIe switch is further configured to determine a destination domain identifier identifying a destination bus hierarchy domain from among a plurality of destination bus hierarchy domains based on the destination address, identify an entry in a requester identifier translation table by matching a source domain identifier of the source bus hierarchy domain with a source domain identifier of the entry in the requester identifier translation table and matching the requester identifier of the request packet with a requester identifier of the entry in the requester identifier translation table, generate a translated requester identifier for identifying the requester identifier and the source bus hierarchy domain, and generate a translated request packet based on the request packet and including the translated requester identifier; and a non-transparent interconnect coupled to the plurality of ports and configured to route the translated request packet to a destination non-transparent endpoint associated with the destination bus hierarchy domain in a destination port of the plurality of ports based on the destination domain identifier.

10. The PCIe switch of claim 9, wherein the source port further comprises a controller that is configured to determine the destination domain identifier identifying a destination bus hierarchy domain, identify the entry in a requester identifier translation table, generate the translated requester identifier, and generate the translated request packet.

11. The PCIe switch of claim 9 wherein the translated requester identifier includes an index to the entry in the requester identifier translation table.

12. A PCIe switch for routing peripheral component interconnect express packets, the PCIe switch comprising:

a plurality of ports including a source port and a plurality of destination ports, the source port comprising a source non-transparent endpoint associated with a source bus hierarchy domain, the source non-transparent endpoint configured to receive a request packet including a destination address and a requester identifier, the PCIe switch configured to determine a destination domain identifier identifying a destination bus hierarchy domain from among a plurality of destination bus hierarchy domains based on the destination address, generate a translated requester identifier, and generate a translated request packet based on the request packet and including the translated requester identifier;

a non-transparent interconnect coupled to the plurality of ports and configured to route the translated request packet to a destination non-transparent endpoint associated with the destination bus hierarchy domain in a destination port of the plurality of ports based on the destination domain identifier; and, wherein the destination non-transparent endpoint is further configured to receive a completion packet including the translated requester identifier and a completer identifier identifying a destination device in the destination bus hierarchy domain, identify the requester identifier based on the translated requester identifier, identify the source bus hierarchy domain based on the translated requester identifier, generate a translated completion packet based on the completion packet and including the requester identifier and the completer identifier, and provide the translated completion packet to the non-transparent interconnect, and wherein the non-transparent interconnect is further configured to route the translated completion packet to the source non-transparent endpoint.

13. The PCIe switch of claim 12, wherein the source non-transparent endpoint is further configured to modify the completer identifier in the translated completion packet to identify the source port and output the translated completion packet from the source port for routing to a source device of the request packet in the source bus hierarchy domain.

14. The PCIe switch of claim 12 wherein the source port includes a first controller configured to determine the destination domain identifier identifying a destination bus hierarchy domain, generate the translated requester identifier, and generate the translated request packet, and further wherein the destination non-transparent endpoint includes a second controller configured to receive the completion packet, identify the requester identifier based on the translated requester identifier, identify the source bus hierarchy domain, generate the translated completion packet, and provide the translated completion packet to the non-transparent interconnect.

15. A PCIe switch for routing peripheral component interconnect express packets, the PCIe switch comprising:
- a plurality of ports including a source port and a plurality of destination ports, the source port comprising a source non-transparent endpoint associated with a source bus hierarchy domain, the source non-transparent endpoint configured to receive a request packet including a destination address and a requester identifier, determine a destination domain identifier identifying a destination bus hierarchy domain from among a plurality of destination bus hierarchy domains based on the destination address, generate a translated requester identifier for identifying the requester identifier and the source bus hierarchy domain, and generate a translated request packet based on the request packet and including the translated requester identifier;
- a non-transparent interconnect coupled to the plurality of ports and configured to route the translated request packet to a destination non-transparent endpoint associated with the destination bus hierarchy domain in a destination port of the plurality of ports based on the destination domain identifier; and,
- wherein, when the request packet is a multicast packet, the source non-transparent endpoint is further configured to identify destination bus hierarchy domains from among the plurality of bus hierarchy domains based on the destination address, generate translated addresses in the destination bus hierarchy domains based on the destination address, and generate translated request packets based on the multicast packet and each including one of the translated addresses and the requester identifier, and wherein the non-transparent interconnect is further configured to route the translated request packets to corresponding destination non-transparent endpoints associated with the destination bus hierarchy domains in destination ports of the plurality of ports.

16. The PCIe switch of claim 15 wherein the source port includes a first controller configured to determine the destination domain identifier identifying a destination bus hierarchy domain, generate the translated requester identifier, identify the destination bus hierarchy domains from among the plurality of bus hierarchy domains, generate translated addresses in the destination bus hierarchy domains, and generate the translated request packets.

17. A PCIe switch for routing peripheral component interconnect express packets, the PCIe switch comprising:
- a plurality of ports including a source port and a plurality of destination ports, the source port comprising a source non-transparent endpoint associated with a source bus hierarchy domain, the source non-transparent endpoint configured to receive a multicast packet including a destination address and a requester identifier, accept the multicast packet based on a base address of the destination address, determine destination domain identifiers identifying corresponding destination bus hierarchy domains based on the destination address, generate a translated requester identifier for identifying the requester identifier and the source bus hierarchy domain, and generate translated request packets based on the multicast packet, each translated request packet including the translated requester identifier;
- a non-transparent interconnect coupled to the plurality of ports and configured route the translated request packets to corresponding destination non-transparent endpoints associated with the destination bus hierarchy domains in destination ports of the plurality of ports based on the destination domain identifiers; and
- wherein the PCIe switch is configured to maintain an address translation table comprising a plurality of entries each including a destination domain identifier and a translated base address, the destination domain identifier and the translated base address of each entry of the plurality of entries in the address translation table together defining a multicast group for identifying a plurality of destination domain identifiers and a corresponding plurality of translated base addresses, and the PCIe switch is further configured to identify an entry in the address translation table based on an index of the destination address, generate the translated addresses by combining an offset of the destination address with the plurality of translated base addresses of the entry in the address translation table, and identify the destination bus hierarchy domains based on the plurality of destination domain identifiers of the entry in the address translation table.

18. The PCIe switch of claim 17, wherein the source non-transparent endpoints are configured to generate translated addresses in the bus hierarchy domains based on the destination address and generate the translated request packets based on the multicast packet, each of the translated request packets including a corresponding one of the translated addresses and the translated requester identifier.

19. The PCIe switch of claim 17, wherein the destination non-transparent endpoints are configured to generate translated addresses in the bus hierarchy domains based on the destination address and generate the translated request packets based on the multicast packet, each of the translated request packets including a corresponding one of the translated addresses and the translated requester identifier.

20. The PCIe switch of claim 17, wherein each of the destination non-transparent endpoints is further configured to modify the translated requester identifier in the translated request packet received by the destination non-transparent endpoint to identify the destination port including the destination non-transparent endpoint, and each destination port including one of the destination non-transparent endpoints is configured to output the translated request packet from the destination port for routing to a destination device in the destination bus hierarchy domain associated with the destination port.

21. A PCIe switch for routing peripheral component interconnect express packets, the PCIe switch comprising:
- a plurality of ports including a source port and a plurality of destination ports, the PCIe switch configured to maintain a requester identifier translation table comprising a plurality of entries, each entry including a source domain identifier and a requester identifier, the source port comprising a source non-transparent endpoint associated with a source bus hierarchy domain, the source non-transparent endpoint configured to receive a request packet including a destination address and a requester identifier, determine a destination domain identifier identifying a destination bus hierarchy domain from among a plurality of destination bus hierarchy domains based on the destination address, identify an entry in the requester identifier translation table by matching a source domain identifier of the source bus hierarchy domain with the source domain identifier of the entry in the requester identifier translation table and matching the requester identifier of the request packet with the requester identifier of the entry in the requester identifier translation table, generate a translated requester identifier including an index to the entry in the requester identifier translation table, and generate a translated request packet based on the request packet and including the translated requester identifier; and a non-transparent interconnect coupled to the plurality of ports and configured to route the translated request packet to a destination non-transparent endpoint associated with the destination bus hierarchy domain in a destination port of the plurality of ports based on the destination domain identifier.

22. A method of routing peripheral component interconnect packets through a PCIe switch comprising a plurality of ports and a non-transparent interconnect coupled to the plurality of ports, the method comprising:

receiving a request packet including a destination address and a requester identifier at a source port of the plurality of ports, the source port comprising a source non-transparent endpoint associated with a source bus hierarchy domain;

identifying a destination bus hierarchy domain from among a plurality of destination bus hierarchy domains based on the destination address;

maintaining a requester identifier translation table in the PCIe switch, the requester identifier translation table comprising a plurality of entries, each of the plurality of entries including a source domain identifier and a requester identifier;

identifying an entry in the requester identifier translation table by matching a source domain identifier of the source bus hierarchy domain with the source domain identifier of the entry in the requester identifier translation table and matching the requester identifier of the request packet with the requester identifier of the entry in the requester identifier translation table;

generating a translated requester identifier for identifying the requester identifier and the source bus hierarchy domain;

generating a translated request packet based on the request packet and including the translated requester identifier; and routing the translated request packet through the non-transparent interconnect of the PCIe switch to a destination non-transparent endpoint associated with the destination bus hierarchy domain.

23. The method of claim 22, further comprising:

generating a translated address in the destination bus hierarchy domain based on the destination address, wherein generating the translated request packet based on the request packet comprises generating the translated request packet including the translated address and the translated requester identifier.

24. The method of claim 22, further comprising:

receiving the request packet at a first port of the PCIe switch;

forwarding the request packet through a PCI-to-PCI bridge of the first port to a first virtual PCI bus of the PCIe switch;

routing the request packet through the first virtual PCI bus to a PCI-to-PCI bridge of the source port; and forwarding the request packet through the PCI-to-PCI bridge of the source port to the source non-transparent endpoint of the source port.

25. The method of claim 22, wherein the request packet is a multicast packet, the method further comprising:

identifying destination bus hierarchy domains based on the destination address;

generating translated addresses in the destination bus hierarchy domain based on the destination address;

generating translated request packets based on the multicast packet and each including one of the translated addresses and the translated requester identifier; and routing the translated request packets to corresponding destination non-transparent endpoints associated with the destination bus hierarchy domains in destination ports of the plurality of ports.

26. A method of routing peripheral component interconnect packets through a PCIe switch comprising a plurality of ports and a non-transparent interconnect coupled to the plurality of ports, the method comprising:

receiving a request packet including a destination address and a requester identifier at a source port of the plurality of ports, the source port comprising a source non-transparent endpoint associated with a source bus hierarchy domain;

identifying a destination bus hierarchy domain from among a plurality of destination bus hierarchy domains based on the destination address;

generating a translated requester identifier for identifying the requester identifier and the source port;

generating a translated request packet based on the request packet and including the translated requester identifier;

routing the translated request packet through the non-transparent interconnect of the PCIe switch to a destination non-transparent endpoint associated with the destination bus hierarchy domain;

modifying the translated requester identifier in the translated request packet to identify the destination port;

outputting the translated request packet from the destination port for routing to a destination device in the destination bus hierarchy domain;

receiving a completion packet at the destination port in response to outputting the translated request packet from the destination port, the completion packet including the translated requester identifier and a completer identifier identifying the destination device;

identifying the requester identifier of request packet based on the translated requester identifier in the completion packet;

generating a translated completion packet based on the completion packet and including the requester identifier and the completer identifier;

routing the translated completion packet through the non-transparent interconnect to the source non-transparent endpoint of the source port; and modifying the completer identifier in the translated completion packet to identify the source port.

27. The method of claim 26, wherein outputting the translated request packet from the destination port for routing to the destination device in the destination bus hierarchy domain comprises:

forwarding the translated request packet through a PCI-to-PCI bridge of the destination port to a first virtual PCI bus of the PCIe switch;

routing the translated request packet through the first virtual PCI bus to a PCI-to-PCI bridge of a first port of the PCIe switch;

forwarding the translated request packet through the PCI-to-PCI bridge of the first port; and outputting the translated request packet from the PCIe switch at the first port for routing to a destination device in the destination bus hierarchy domain.

28. The method of claim 27, further comprising:

receiving the completion packet at the first port of the PCIe switch;

forwarding the completion packet through the PCI-to-PCI bridge of the first port to the first virtual PCI bus of the PCIe switch;

routing the completion packet through the first virtual PCI bus to the PCI-to-PCI bridge of the destination port; and forwarding the completion packet through the PCI-to-PCI bridge of the destination port to the destination non-transparent endpoint of the destination port.

29. The method of claim 28, further comprising:

receiving the request packet at a second port of the PCIe switch;

forwarding the request packet through a PCI-to-PCI bridge of the second port to a second virtual PCI bus of the PCIe switch;

routing the request packet through the second virtual PCI bus to a PCI-to-PCI bridge of the source port;

forwarding the request packet through the PCI-to-PCI bridge of the source port to the source non-transparent endpoint of the source port;

forwarding the translated completion packet through the PCI-to-PCI bridge of the source port to the second virtual PCI bus after modifying the completer identifier in translated completion packet to identify the source port;

routing the translated completion packet through the second virtual PCI bus to the PCI-to-PCI bridge of the second port;

forwarding the translated completion packet through the PCI-to-PCI bridge of the second port; and outputting the translated completion packet from the PCIe switch at the second port for routing to a source device in the source bus hierarchy domain.

30. The method of claim 29, further comprising routing the completion packet to the source device in the source bus hierarchy domain based on the requester identifier.

* * * * *